United States Patent
Paladugu et al.

(10) Patent No.: US 12,010,508 B2
(45) Date of Patent: Jun. 11, 2024

(54) PEER-TO-PEER LINK SECURITY SETUP FOR RELAY CONNECTION TO MOBILE NETWORK

(71) Applicant: QUALCOMM Incorporated, San Diego, CA (US)

(72) Inventors: Karthika Paladugu, San Diego, CA (US); Hong Cheng, Basking Ridge, NJ (US); Adrian Edward Escott, Reading (GB); Gavin Bernard Horn, La Jolla, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 17/236,969

(22) Filed: Apr. 21, 2021

(65) Prior Publication Data
US 2021/0337381 A1 Oct. 28, 2021

Related U.S. Application Data

(60) Provisional application No. 63/014,032, filed on Apr. 22, 2020.

(51) Int. Cl.
*H04W 12/033* (2021.01)
*H04W 12/0471* (2021.01)
(Continued)

(52) U.S. Cl.
CPC ..... *H04W 12/033* (2021.01); *H04W 12/0471* (2021.01); *H04W 12/06* (2013.01);
(Continued)

(58) Field of Classification Search
CPC ............... H04W 12/033; H04W 76/14; H04W 12/0471; H04W 12/06; H04W 84/042; H04W 88/04
See application file for complete search history.

(56) References Cited

U.S. PATENT DOCUMENTS 8,204,992 B2 * 6/2012 Arora ................... H04L 67/107
713/168
9,979,730 B2 * 5/2018 Wong .................. H04L 63/0281
(Continued)

FOREIGN PATENT DOCUMENTS

CN 107465537 A 12/2017
CN 108353275 A 7/2018
(Continued)

OTHER PUBLICATIONS

"3rd Generation Partnership Project, Technical Specification Group Services and System Aspects; Study on Security Aspects of 3GPP support for Advanced V2X Services (Release 16)", 3GPP TR 33.836, V0.5.0, 3GPP Draft, S3-194626, 3rd Generation Partnership Project (3GPP), Mobile Competence Centre, 650, Route Des Lucioles, F-06921, Sophia-Antipolis Cedex, France, Dec. 3, 2019 (Dec. 3, 2019), XP051835571, pp. 1-50, Retrieved from the Internet: URL: https://ftp.3gpp.org/tsg_sa/WG3_Security/TSGS3_97_Reno/Docs/S3-194626.zipS3-194626_TR33836-050_v1-rm.doc [retrieved on Dec. 3, 2019] the whole document.
(Continued)

*Primary Examiner* — Samson B Lemma
(74) *Attorney, Agent, or Firm* — Loza & Loza LLP

(57) ABSTRACT

Various aspects pertain to ways to securing a peer-to-peer communication link that serves to relay transmissions to/from a managed mobile network node. A first user equipment may identify a second user equipment that can communicate via a peer-to-peer wireless interface and serve as a relay between the first user equipment and a managed mobile network node. A relay session key material may be obtained from the managed mobile network node. A peer-to-peer communication link between the first user equipment and the second user equipment may be established or modified by, for example, securing the peer-to-peer communication link based on the relay session key material. A
(Continued)

protocol data unit session may be established, over the peer-to-peer communication link, between the first user equipment and the managed mobile network node for secured transmissions there between.

26 Claims, 13 Drawing Sheets

(51) Int. Cl.
    *H04W 12/06*     (2021.01)
    *H04W 76/14*     (2018.01)
    *H04W 84/04*     (2009.01)
    *H04W 88/04*     (2009.01)

(52) U.S. Cl.
    CPC .......... *H04W 76/14* (2018.02); *H04W 84/042* (2013.01); *H04W 88/04* (2013.01)

(56) References Cited

U.S. PATENT DOCUMENTS

| | | | | |
|---|---|---|---|---|
| 10,142,769 | B2* | 11/2018 | Agiwal | H04W 12/041 |
| 11,871,465 | B2* | 1/2024 | Pan | H04W 76/14 |
| 2013/0298209 | A1* | 11/2013 | Targali | H04W 12/06 |
| | | | | 726/6 |
| 2015/0230209 | A1* | 8/2015 | Jactat | H04W 72/51 |
| | | | | 370/315 |
| 2016/0065362 | A1* | 3/2016 | Choyi | H04L 63/065 |
| | | | | 380/279 |
| 2019/0296915 | A1* | 9/2019 | Lancashire | H04L 9/3247 |
| 2020/0120728 | A1* | 4/2020 | Wallentin | H04W 88/04 |

FOREIGN PATENT DOCUMENTS

| | | | | |
|---|---|---|---|---|
| WO | | 2016114604 A1 | 7/2016 | |
| WO | | WO-2016114604 A1 * | 7/2016 | ......... H04L 63/0428 |
| WO | | 2017071588 A1 | 5/2017 | |
| WO | | 2018031344 A2 | 2/2018 | |
| WO | | WO-2018031344 A2 * | 2/2018 | ......... H04W 12/037 |

OTHER PUBLICATIONS

International Search Report and Written Opinion—PCT/US2021/028598—ISA/EPO—dated Jul. 21, 2021.
Qualcomm Incorporated: "Discussion on Remaining Issues of L3 Relay," 3GPP Draft, 3GPP TSG RAN WG2 Meeting #112-e, R2-2008962, 3rd Generation Partnership Project (3GPP), Mobile Competence Centre, 650, Route Des Lucioles, F-06921, Sophia-Antipolis Cedex, France, vol. RAN WG2, No. E-Conference, Nov. 2, 2020-Nov. 13, 2020, Oct. 23, 2020 (Oct. 23, 2020), XP051942012, 10 pages, Retrieved from the Internet: URL: https://ftp.3gpp.org/tsg_ran/WG2_RL2/TSGR2_112-e/Docs/R2-2008962.zip R2-2008962—Discussion on remaining issues of L3 relay.doc [retrieved on Oct. 23, 2020] the whole document.
Qualcomm Incorporated: "Modifications to Solution#6: Layer-3 UE-to-Network Relay," 3GPP Draft, SA WG2 Meeting #136AH, S2-2000574, 3rd Generation Partnership Project (3GPP), Mobile Competence Centre, 650, Route Des Lucioles, F-06921, Sophia-Antipolis Cedex, France, vol. SA WG2, No. Incheon, Korea, Jan. 13, 2020-Jan. 17, 2020, Jan. 7, 2020 (Jan. 7, 2020), XP051842632, 4 pages, Retrieved from the Internet: URL: https://ftp.3gpp.org/tsg_sa/WG2_Arch/TSGS2_136AH_Incheon/Docs/S2-2000574.zip S2-20005747-modifications to end-to-end security in L3 Ue-to-NW relay soln.doc [retrieved on Jan. 7, 2020], pp. 1-4, the whole document.
Qualcomm Incorporated: "Remaining Issues on L2 U2N Relay", 3GPP Draft, 3GPP TSG RAN WG2 Meeting #113-e, R2-2100124, 3rd Generation Partnership Project (3GPP), Mobile Competence Centre, 650, Route Des Lucioles, F-06921, Sophia-Antipolis Cedex, France, vol. RAN WG2. No. E-Conference, Jan. 25, 2021-Feb. 5, 2021, Jan. 15, 2021 (Jan. 15, 2021), XP051973341, 23 pages, Retrieved from the Internet: URL: https://ftp.3gpp.org/tsg_ran/WG2_RL2/TSGR2_113-e/Docs/R2-2100124.zip R2-2100124—Remaining issues on L2 U2N relay.doc [retrieved on Jan. 15, 2021], the whole document.

* cited by examiner

PEER-TO-PEER LINK SECURITY SETUP FOR RELAY CONNECTION TO MOBILE NETWORK

CROSS-REFERENCE TO RELATED APPLICATIONS

This application claims priority based on U.S. Provisional Patent Application Ser. No. 63/014,032, filed Apr. 22, 2020, for "Peer-To-Peer Link Security Setup For Relay Connection to Mobile Network," which is assigned to the assignee hereof and incorporated by reference herein in its entirety.

TECHNICAL FIELD

The technology discussed herein relates generally to wireless communication systems, and more particularly to providing a secured peer-to-peer communication link that can serve to relay communications between a user equipment and a mobile network.

INTRODUCTION

In wireless communication systems, user equipment may wish to communicate via a managed mobile network but may not have a compatible wireless interface or resources to do so. In other instances, the user equipment may wish to reduce its power consumption yet still be able to communicate with the mobile network. In yet other instances, the user equipment may be able to communicate directly with the mobile network yet it may wish to increase its bandwidth of data transmitted to the mobile network. In all these instances, one solution may be to utilize a nearby user equipment as a relay between the user equipment and the mobile network. That is, a peer-to-peer communication link may be setup between a remote user equipment and a nearby relaying user equipment. The relaying user equipment may have its own wireless interface to the mobile network which may be used to relay messages between the remote user equipment and the mobile network. However, securing the peer-to-peer communication link is a challenge since it is often setup without involvement from the managed mobile network.

Consequently, a solution is needed that allows a remote user equipment to setup a secure peer-to-peer communication link with a relay user equipment which can serve to communicate with a managed mobile network.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

A first aspect provides a first user equipment and method operational thereon for securing a peer-to-peer communication link. For example, the peer-to-peer communication link may be a Proximity Services Sidelink (PC5). A second user equipment is identified that can communicate via a peer-to-peer wireless interface and serve as a relay between the first user equipment and a managed mobile network node. For instance, the managed mobile network node may be part of a 5G radio access network. A relay session key material is obtained from the managed mobile network node. A peer-to-peer communication link may then be established or modified with the second user equipment, the peer-to-peer communication link secured based on the relay session key material. a protocol data unit session with the managed mobile network node is then established over the peer-to-peer communication link.

To obtain the relay session key material, a message may be directly sent to the managed mobile network node, the message including a relay identifier for the second user equipment. In response, the relay session key material may be received from the managed mobile network node in response to the message.

In one example, identifying the second user equipment may include obtaining the relay identifier from the second user equipment, and the relay identifier is at least one of: (a) a radio network temporary identifier for the second user equipment, and (b) a cell identifier for the second user equipment.

In one implementation, the peer-to-peer communication link is established prior to the relay session key material being obtained. Therefore, a message is sent to the managed mobile network node via the peer-to-peer communication link, the message including a relay identifier for the second user equipment. In response, the relay session key material may be received from the managed mobile network node in response to the message. The peer-to-peer communication link is then secured based on the relay session key material.

In various examples, the relay session key material may include or is based on at least two of: (a) a relay identifier for the second user equipment; (b) a first user equipment identifier; (c) a target mobile network node key; (d) a first nonce provided by the first user equipment; (e) a second nonce provided by the second user equipment; and (f) a counter value provided by the managed mobile network node.

A second aspect provides a first user equipment and method operational thereon for securing a peer-to-peer communication link A network communication link may be established with a managed mobile network node. A peer-to-peer communication link may then be established with a second user equipment. A relay session key material may be obtained generated by the managed mobile network node. The peer-to-peer communication link may be secured based on the relay session key material. The first user equipment may then relay, over the peer-to-peer communication link, a protocol data unit session between the second user equipment and the managed mobile network node.

A third aspect provides a first user equipment and method operational thereon for securing a peer-to-peer communication link A second user equipment is identified that can communicate via a peer-to-peer wireless interface and serve as a relay between the first user equipment and a managed mobile network node. A peer-to-peer communication link may be established with the second user equipment, the peer-to-peer communication link secured based on a pre-shared key known to the first user equipment and the second user equipment. A protocol data unit session may be established with the managed mobile network node over the peer-to-peer communication link. The first user equipment may then send, over the peer-to-peer communication link, data for the protocol data session to the managed mobile network node.

A fourth aspect provides a mobile network node and method operational thereon for securing a peer-to-peer communication link by (a) establishing a network communication link with a relay user equipment, (b) receiving a request for relay session key material to secure a peer-to-peer communication link between the user equipment and a remote user equipment, (c) deriving a relay session key material in response to the request, (d) sending the relay session key material to the relay user equipment, and/or (e) sending the relay session key material to the remote user equipment.

These and other aspects of the present disclosure will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

For wireless communication systems that support user equipment (UE) devices with reduced number of receiving antennas, one solution to the potential coverage loss on downlink channels may be to use repetition at an intra-slot level. That is, a downlink control channel may be repeated one or more times within defined monitoring occasions in a slot to permit a receiving user device to enhance or improve reception coverage.

Figure 1:
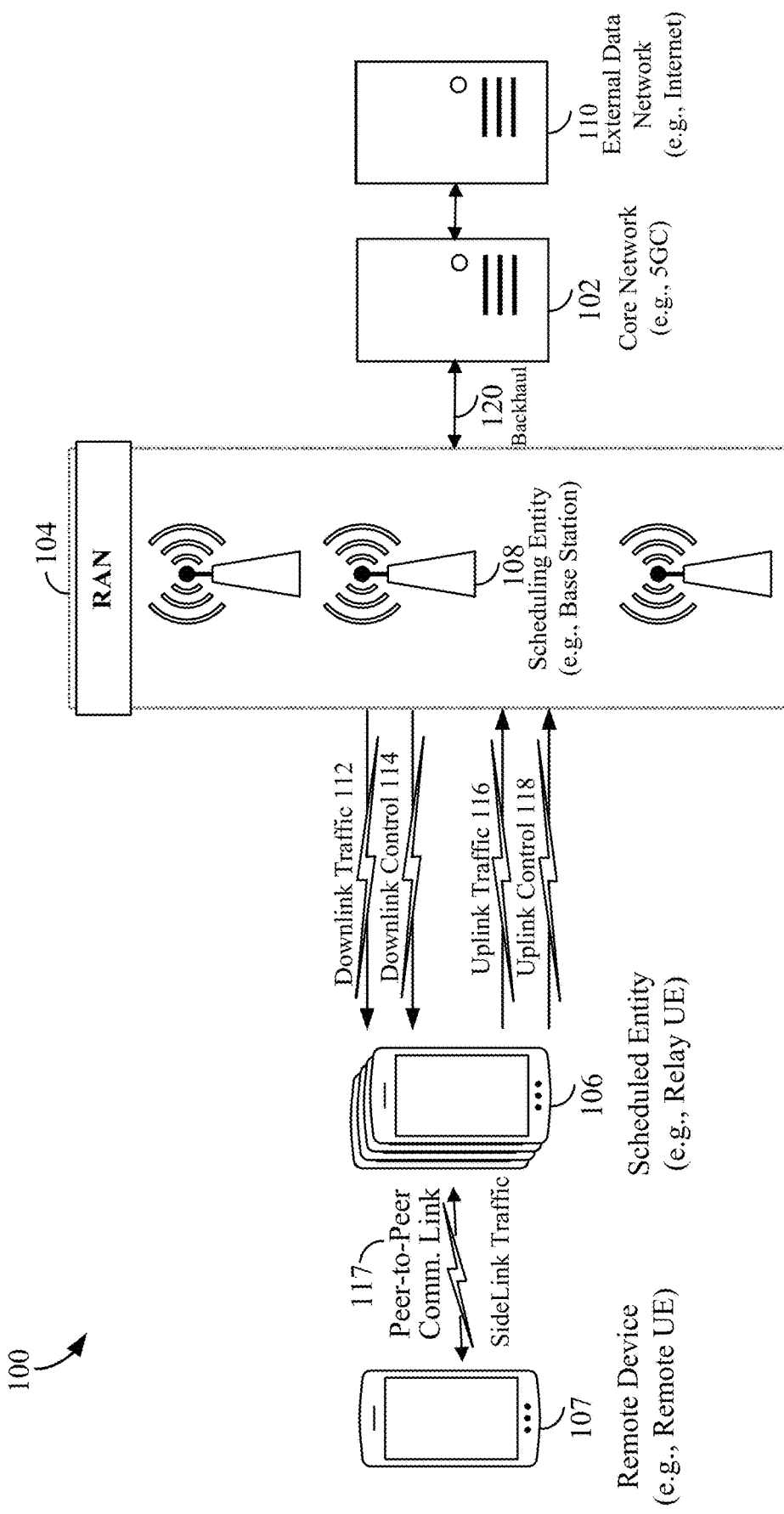
FIG. 1 is a schematic illustration of an exemplary wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and user equipment (UE) 106 and 107. By virtue of the wireless communication system 100, the UE 106 may be enabled to carry out data communication with an external data network 110, such as (but not limited to) the Internet.

The RAN 104 (e.g., a managed mobile network) may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eU-TRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

According to one aspect, the scheduled entity 106 may establish a peer-to-peer communication link 117 with a remote device 107 (e.g., remote UE). The remote device 107 may then use the peer-to-peer communication link 117 to establish a communication session with the RAN 104. In such configuration, the scheduled entity 106 may serve as a relaying UE to facilitate communications between the remote device 107 and the RAN 104. In one aspect, while the peer-to-peer communication link 117 is established directly between the scheduled entity 106 and the remote device 107, it may be secured by information provided by the RAN 104 (e.g., a mobile network node or base station in the RAN).

Figure 2:
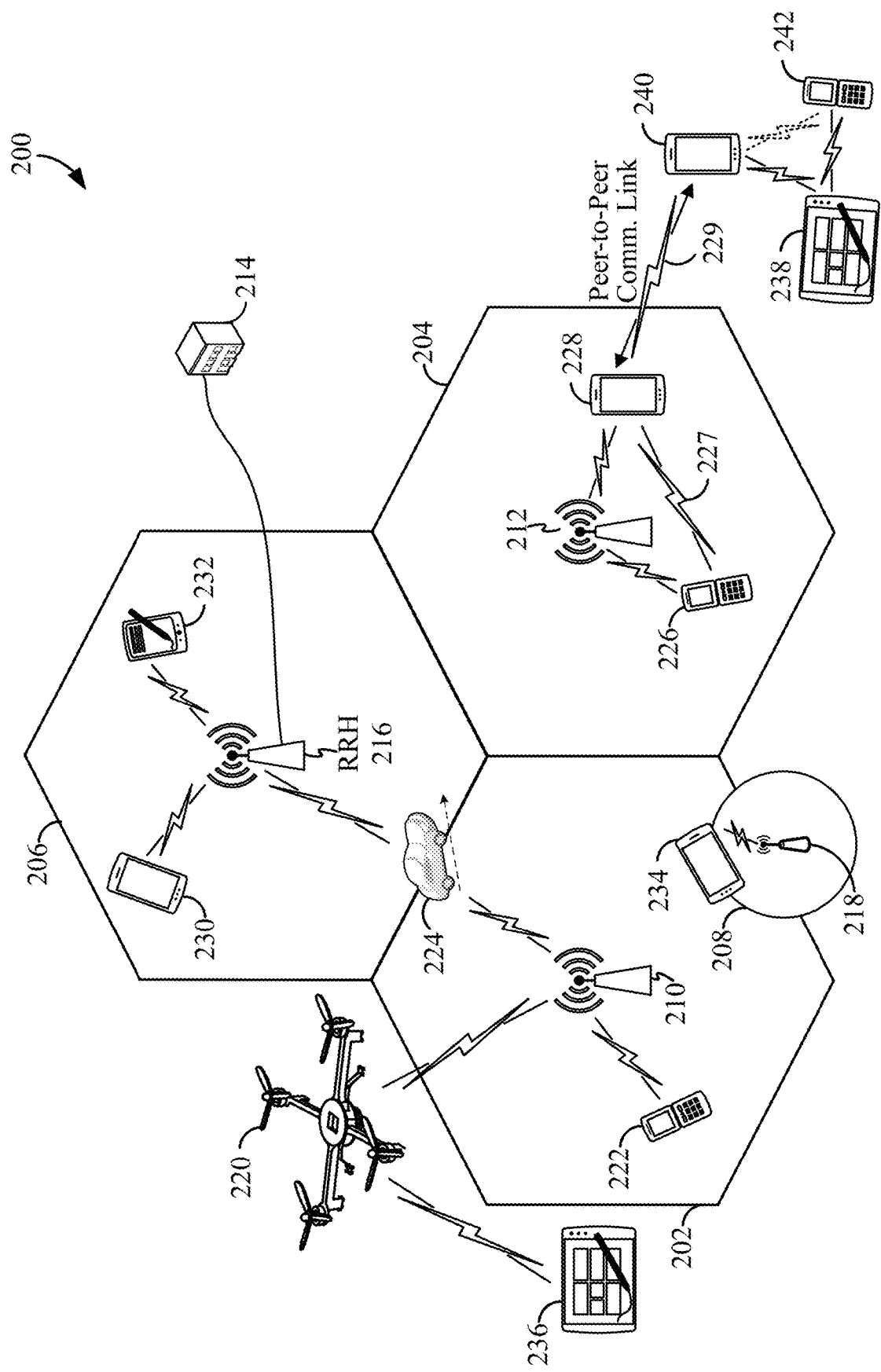
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 or remote device 107 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer-to-peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

According to one aspect, some UEs may establish peer-to-peer communication links 227 and 229. For instance, remote UEs 226, 240 and 238 and relay UEs 228 may establish such peer-to-peer communication links, which may then enable the remote UEs to establish communication sessions with the mobile network (e.g., base stations 210, 212, and 214) through the relay UEs. While the remote UEs and relay UEs may negotiate and establish the peer-to-peer communication links 227 and 229 on their own, the mobile network may provide or contribute information to secure communications over the peer-to-peer communication link. In other implementations, the peer-to-peer communication links 227 and 229 may be secured by a pre-shared key known to the remote UE and the relay UE.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

As referred to within the present disclosure, a frame may refer to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary downlink subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE. In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 millisecond (ms) subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., the PDCCH), and the data region 314 may carry data channels (e.g., PDCCH or PUSCH). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Figure 3:
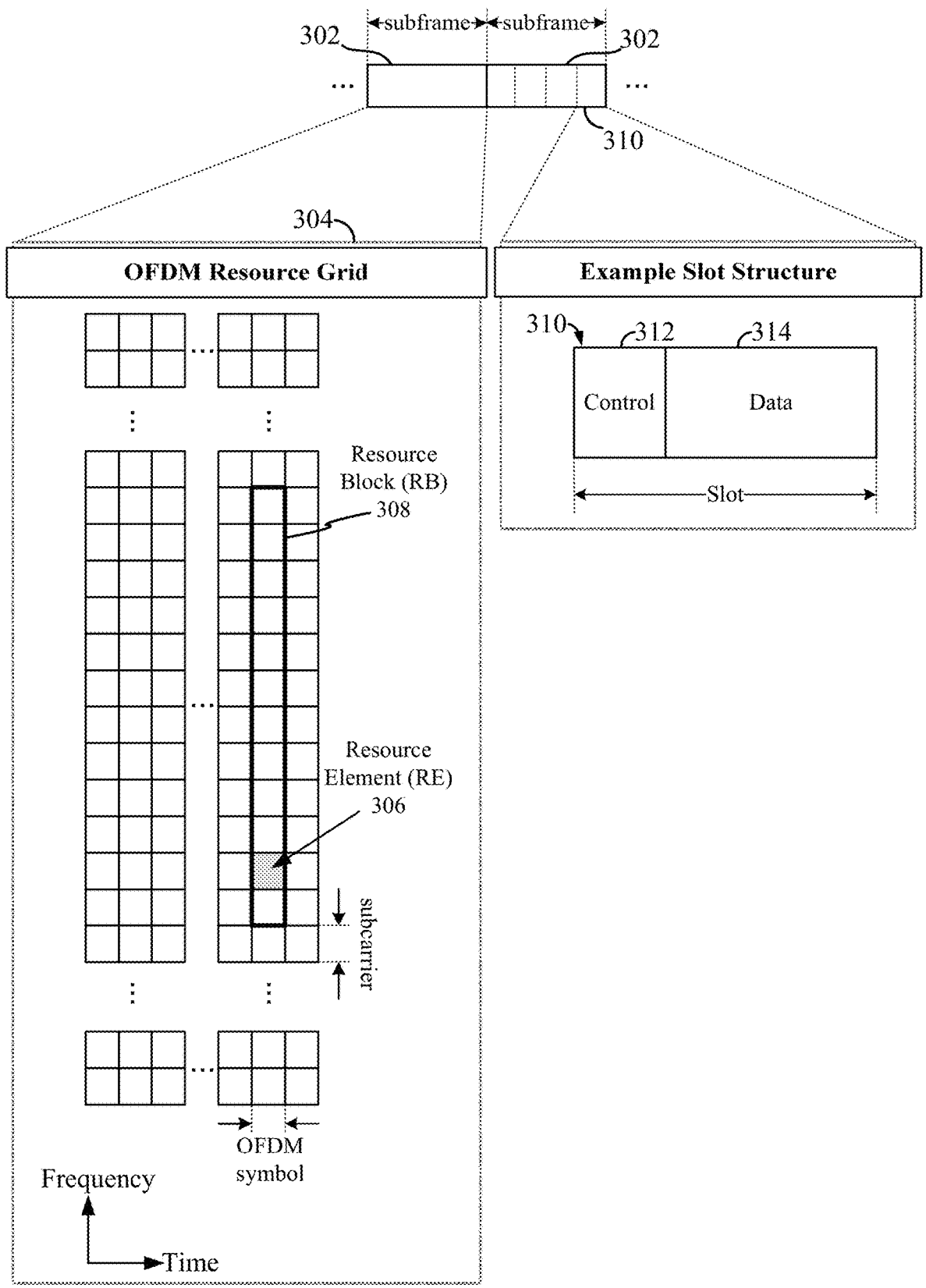
FIG. 3 illustrates an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative-acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1-3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Securing Peer-To-Peer Communication Link for Relaying to Mobile Network

In establishing a peer-to-peer communication link between a remote device and a relay device, the relay UE may relay traffic on behalf of remote UE. To authenticate each other and/or secure the peer-to-peer communication link, the relay UE and remote UE may establish or derive keys for these purposes. One example of such peer-to-peer communications link is Vehicle-to-Everything (V2X) communications defined by 3GPP that enable vehicles to communicate with the traffic, sensors, and the environment around them using short-range wireless signals. V2X communications may utilize a PC5 interface for peer-to-peer communication links. In V2X communications, the data used for such key derivation may be provided by an application layer. However, relying on an application to secure a sidelink (SL) (e.g., a peer-to-peer communication link) to the managed mobile network may not be suitable for commercial applications.

According to one aspect, while the peer-to-peer communication link may be setup or established directly between the remote UE and the relay UE, security keys for the peer-to-peer communication link may be established with the help of the managed mobile network (e.g., 5G network, RAN, etc.).

Figure 4:
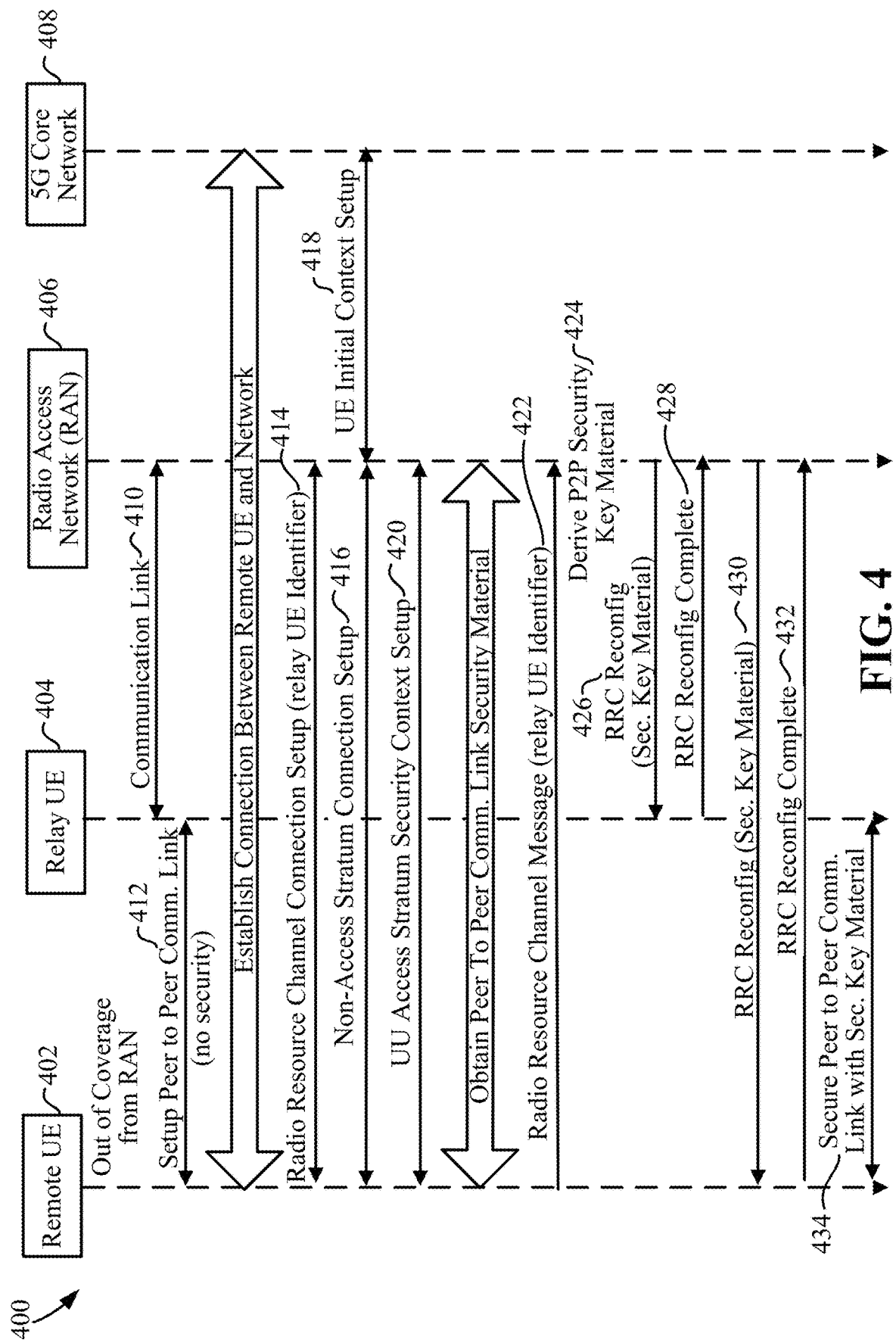
FIG. 4 illustrates an exemplary system in which security for a peer-to-peer communication link may be setup with assistance from a managed mobile network when the remote UE is out of coverage from the managed mobile network.

FIG. 4 illustrates an exemplary system in which security for a peer-to-peer communication link may be setup with assistance from a managed mobile network when the remote UE is out of coverage from the managed mobile network. In this example, a remote UE 402 may be out of coverage from a radio access network (RAN) 406. The remote UE 402 may discover a relay UE 404, e.g., from broadcasts sent by the relay UE 404. In this process, the remote UE 402 may obtain one or more identifiers for the relay UE 404 (e.g., Radio Network Temporary Identifier RNTI for relay UE, Cell Identifier for relay UE). The relay UE 404 may have a communication link 410 with the RAN 406 (e.g., managed mobile network). The remote UE 402 and relay UE may then setup a peer-to-peer communication link 412 (e.g., a unicast link). Initially, until it is secured using security key material obtained from the RAN, the peer-to-peer communication link may have Null security. Additionally, even with Null security, some basic non-authentication based methods (e.g., public-private key exchange) may be used to establish some keys with which to temporarily secure communications over the peer-to-peer communication link.

Figure 5:
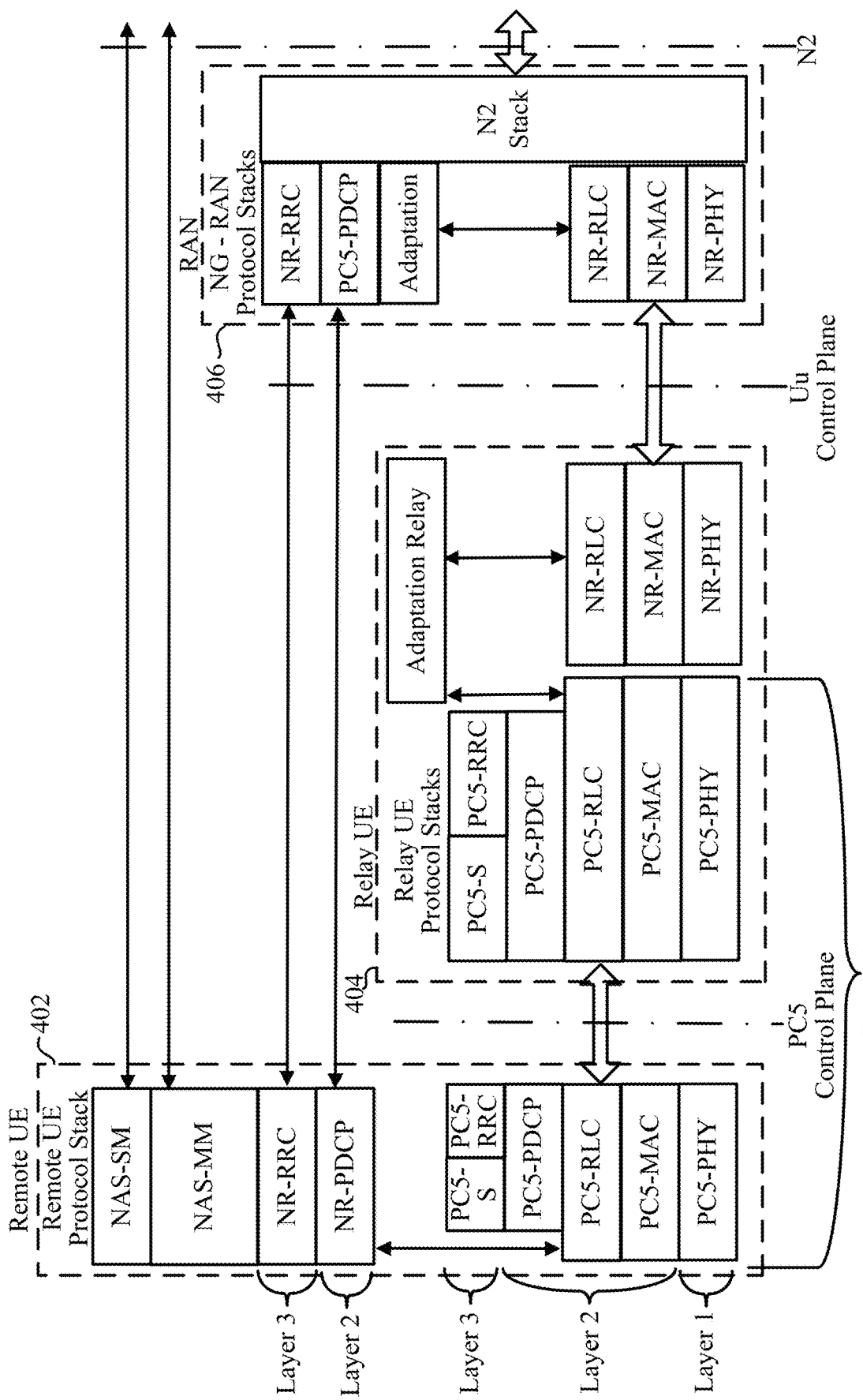
FIG. 5 illustrates one example of a protocol stack used over the peer-to-peer communication link in FIG. 4.

FIG. 5 illustrates one example of a protocol stack used over the peer-to-peer communication link in FIG. 4. In the example of FIG. 4, the peer-to-peer communication link may be used for a direct communication link between the remote UE 402 and the relay UE 404, as well as a relay communication link between the remote UE and the managed mobile network (e.g., RAN 406 and Core Network 408).

In one example, the direct communication link between the remote UE and the relay UE may employ a PC5 interface having a protocol stack that includes multiple protocol layers. The protocol layers may include a PC5 Physical Layer (PHY), a PC5 Media Access Control (MAC) Layer, a PC5 Radio Link Control (RLC) Layer, a PC5 Packet Data Convergence Control (PDCP) Layer, a PC5 Radio Resource Control (RRC) Layer, and a PC5 Signaling (S) Layer.

Additionally, the relay communication link between the remote UE 402 and the managed mobile network (e.g., RAN 406 and core network 408) may employ a New Radio (NR) 5G interface having a protocol stack that includes multiple protocol layers. The protocol layers may include a NR Packet Data Convergence Control (PDCP) Layer, a NR Radio Resource Control (RRC) Layer, a Non-Access Stratum Mobility Management (NAS-MM) Layer, and a Non-Access Stratum Session Management (NAS-SM) Layer. An Adaptation Layer may serve to support traffic multiplexing for multiple UEs at the Relay UE.

In this example, both the PC5 C-plane and NR Uu C-plane reach the remote UE 402, thereby allowing remote UE 402 to send messages to the managed mobile network (e.g., RAN 406 and core network 408). The PC5 C-plane may serve to setup the direct unicast communication link prior to relaying. The remote UE 402 may support NR Uu AS and NAS connections (above PC5 RLC). The RAN may control the remote UE's PC5 communication link via NR RRC messaging.

Other protocol stacks are contemplated to be used for the peer-to-peer communication link 412. Sometimes, the various protocol layers are denoted as Layer 1 (e.g., PHY), Layer 2 (e.g., MAC, RLC, and PDCP Layers), and Layer 3 (e.g., S Layer and RRC Layer).

Referring again to FIG. 4, since the remote UE 402 does not have a direct connection to the RAN 406, it may use the peer-to-peer communication link, through the relay UE 404, to establish a connection to the managed mobile network (e.g., RAN 406 and 5G Core Network 408). In one example, the remote UE 402 may perform a Radio Resource Channel (RRC) setup 414, including a relay UE identifier (e.g., Radio Network Temporary Identifier RNTI for relay UE, Cell Identifier for relay UE), with the RAN 406. The remote UE 402 may then perform, via the peer-to-peer communication link, a Non-Access Stratum Connection setup 416 with the RAN 406 which consequently performs an Initial Context Setup 418 with a Core Network 408. The remote UE 402 may then perform, via the peer-to-peer communication link, a Uu Access Stratum Security Context setup 420 with the RAN 406. The remote UE 402 thus establishes a communication link with the managed mobile network (e.g., RAN 406 and core network 408) via the relay UE 404.

Security keys or material may then be obtained from the managed mobile network to secure the peer-to-peer communication link. The remote UE 402 may send an RRC message 422 with the relay UE identifier to request information or material with which to setup a P2P security key. As a result, the RAN 406 may obtain or derive security key material 424. The security key material 424 may be sent by the RAN 406 to the relay UE 404 in an RRC Reconfiguration message 426 and may receive an RRC Reconfiguration Complete message 428 in return. Similarly, the security key material 424 may be sent by the RAN 406 to the remote UE 402 in an RRC Reconfiguration message 430 and may receive an RRC Reconfiguration Complete message 432 in return. The remote UE 402 and relay UE 404 may then use the security key material to secure the peer-to-peer communication link 434. For example, the remote UE 402 and the relay UE 404 may use the security key material to generate a security key that may be used to secure or encrypt/decrypt transmission over the P2P communication link.

In this implementation, authentication of the remote UE 402 and relay UE 404 may be performed by the RAN 406 during the Uu connection setup 420. Consequently, authentication between the remote UE 402 and the relay UE 404 is not necessary during setup 412 and/or modification 434 of the peer-to-peer communication link (e.g., of the PC5 unicast link).

In one example, the security key may be used to secure Layer 2 (e.g., PDCP, RLC, and/or MAC) transmissions over the peer-to-peer communication network.

Figure 6:
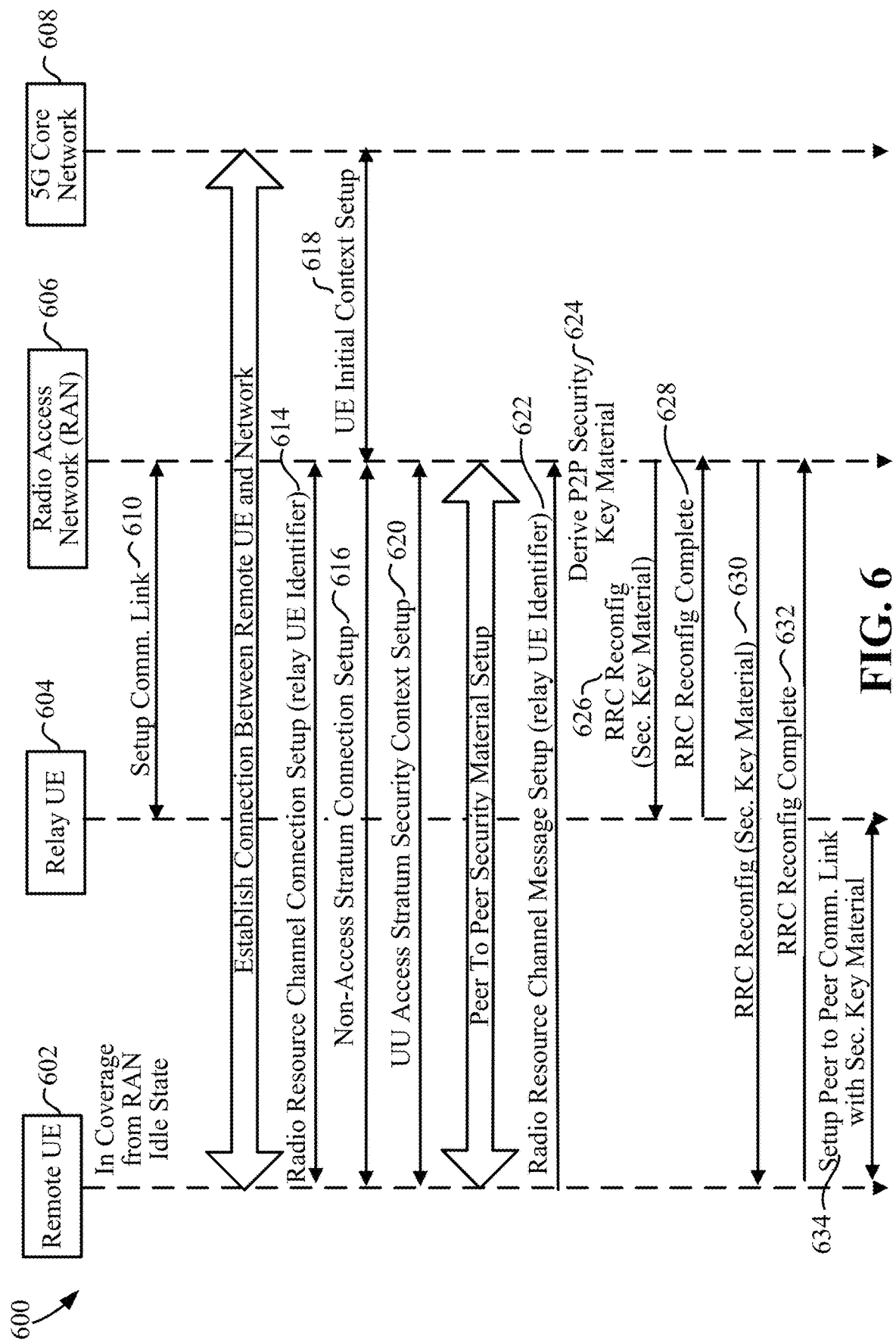
FIG. 6 illustrates another exemplary system in which security for a peer-to-peer communication link may be setup with assistance from a managed mobile network when the remote UE is in coverage of the managed mobile network with its connection in idle state.

FIG. 6 illustrates another exemplary system in which security for a peer-to-peer communication link may be setup with assistance from a managed mobile network when the remote UE is in coverage of the managed mobile network with its connection in idle state. The remote UE 602 may discover a relay UE 604, e.g., from broadcasts sent by the relay UE 604. In this process, the remote UE 602 may obtain one or more identifiers for the relay UE 604 (e.g., Radio Network Temporary Identifier RNTI for relay UE, Cell Identifier for relay UE). The relay UE 604 may have a communication link 610 with the RAN 606 (e.g., managed mobile network).

In this example, a remote UE 602 may be in coverage of a radio access network (RAN) 606 and its connection to a RAN 606 may be in an idle state. Consequently, the remote UE 602 may perform a Radio Resource Channel (RRC) setup 614, including a relay UE identifier (e.g., Radio Network Temporary Identifier RNTI for relay UE, Cell Identifier for relay UE), with the RAN 606 to change its state to connected. The remote UE 602 may then perform a Non-Access Stratum Connection setup 616 directly with the RAN 606 which consequently performs an Initial Context Setup 618 with a Core Network 608. The remote UE 602 may then perform a Uu Access Stratum Security Context setup 620 directly with the RAN 606. The remote UE 602 thus establishes a communication link with the managed mobile network (e.g., RAN 606 and core network 608).

In one example, during RRC connection setup 614, the remote UE 602 may indicate the relay UE identifier in order to obtain security key material for a peer-to-peer communication link between the remote UE 602 and the relay UE 604. However, due to the RRC Connection Setup message size constraints, the remote UE 602 may not be able to include the relay UE identifier or related ID information.

In such case, the remote UE 602 may send an RRC message 622 with the relay UE identifier to request information or material with which to setup a P2P security key. As a result, the RAN 606 may obtain or derive security key material 624. The security key material 624 may be sent by the RAN 606 to the relay UE 604 in an RRC Reconfiguration message 626 and may receive an RRC Reconfiguration Complete message 628 in return. Similarly, the security key material 624 may be sent by the RAN 606 to the remote UE 602 in an RRC Reconfiguration message 630 and may receive an RRC Reconfiguration Complete message 632 in return.

Generally, the remote UE 602 and relay UE 604 may then use the security key material to setup and secure the peer-to-peer communication link 634. For instance, the security key material may be used by the relay UE 604 and the remote UE 602 to generate a relay session key that then secures the peer-to-peer communication link (e.g., relay session key serves to encrypt/decrypt transmissions/communications over the peer-to-peer communication link 634).

In one example, the same security key material is sent to both the Relay UE 604 and the remote UE 602. For instance, such security key material may include: a remote UE identifier (e.g., C-RNTI), a relay UE identifier (e.g., C-RNTI), a root or network session key (KgNB), and/or a ciphering algorithm. The security key material may serve to derive a relay session key (KNRP) which may be used to secure the peer-to-peer communication link 634 (e.g., by using the relay session key with the ciphering algorithm).

In other examples, different security key material is sent to the relay UE 604 and the remote UE 602. For example, a first security key material may be sent to the relay UE 604, where the first security key material includes at least the relay session key (KNRP) and an indication of a ciphering algorithm (e.g., an encryption algorithm, an integrity algorithm, etc.). The relay session key may be used with the ciphering algorithm to secure the peer-to-peer communication link. Similarly, a second security key material may be sent to the remote UE 602, where the second security key material may include the remote UE identifier (e.g., C-RNTI) and the relay UE identifier (e.g., C-RNTI), which along with the concurrently-sent or previously-obtained network session key (KgNB), may serve for the remote UE 602 to derive or generate the relay session key (KNRp). An indication of the ciphering algorithm (e.g., an encryption algorithm, an integrity algorithm, etc.) may be obtained by the remote UE 602 along with the second security key material or from the relay UE 604 or may be previously obtained the remote UE 602.

The RAN 606 may be configured to change the root or network session key (KgNB) when it detects that the relay UE has changed. This ensures that the same security key material is not used for a remote UE communicating via a new relay UE, which is assigned the same C-RNTI as the previous relay UE under the same serving cell (gNodeB).

In another approach, the security key material for the peer-to-peer communication link may use freshness/randomness parameters that are exchanged. For instance, the security key material sent to the relay UE 604 and remote UE 602 may include: (a) a relay identifier for the first user equipment (e.g., relay UE 604), (b) a second user equipment identifier for the second user equipment (e.g., remote UE 602), (c) a mobile network node key, (d) a first nonce provided by the first user equipment (e.g., relay UE 604), (e) a second nonce provided by the second user equipment (e.g., remote UE 602), and/or (f) a counter value provided by the managed mobile network node.

In one example, the security key may be used to secure Layer 2 (e.g., PDCP, RLC, and/or MAC) transmissions and/or to secure Layer 3 (e.g., RRC) transmissions over the peer-to-peer communication network. Additionally, a new security key material may also be provided by the managed mobile network every time a base station handover occurs.

Figure 7:
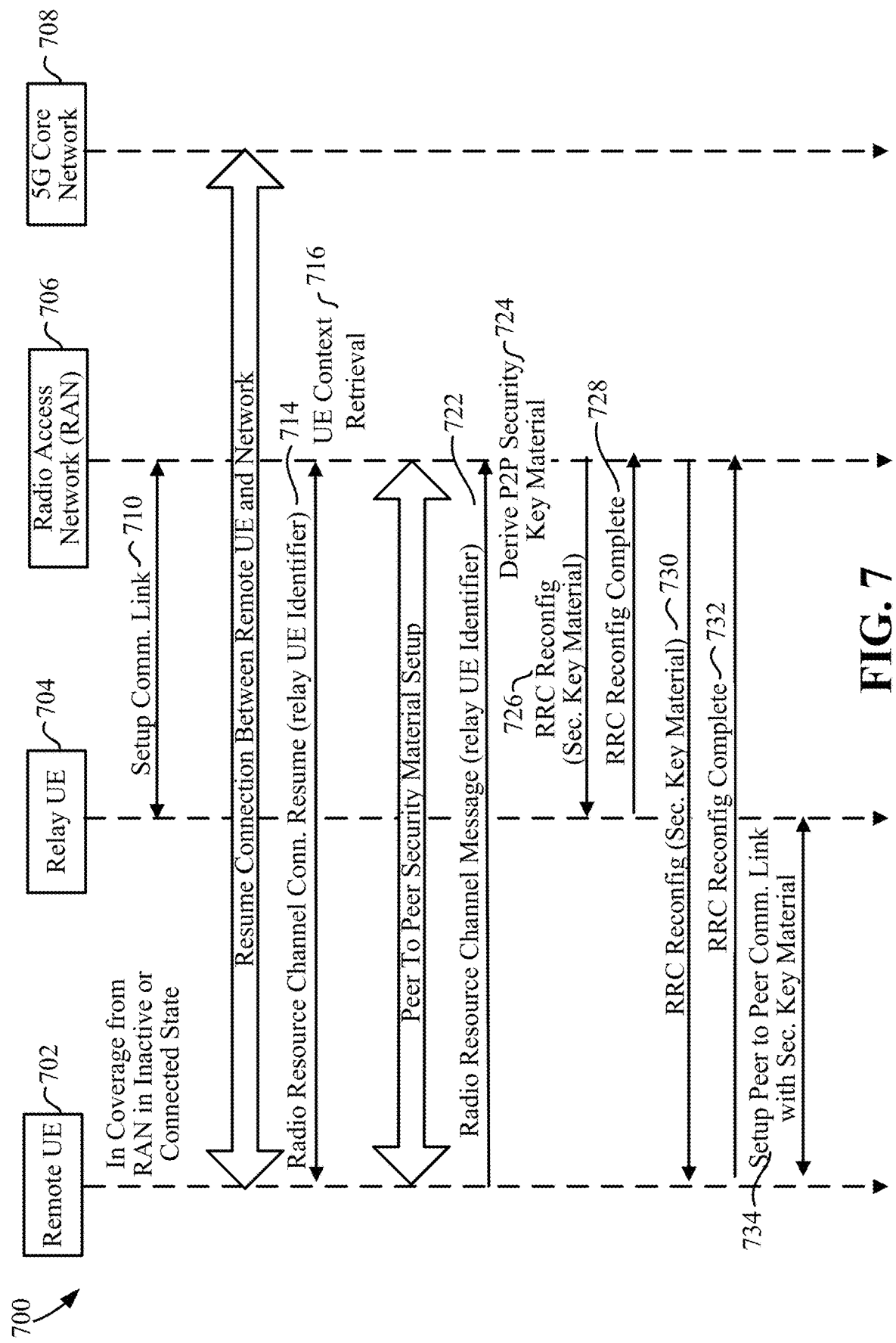
FIG. 7 illustrates another exemplary system in which security for a peer-to-peer communication link may be setup with assistance from a managed mobile network when the remote UE is in coverage of the managed mobile network with its connection in inactive state or connected state.

FIG. 7 illustrates another exemplary system in which security for a peer-to-peer communication link may be setup with assistance from a managed mobile network when the remote UE is in coverage of the managed mobile network with its connection either in inactive state or in connected state. The remote UE 702 may discover a relay UE 704, e.g., from broadcasts sent by the relay UE 704. In this process, the remote UE 702 may obtain one or more identifiers for the relay UE 704 (e.g., Radio Network Temporary Identifier RNTI for relay UE, Cell Identifier for relay UE). The relay UE 704 may have a communication link 710 with the RAN 706 (e.g., managed mobile network).

In this example, a remote UE 702 may be in coverage of a radio access network (RAN) 706 and its connection to a RAN 706 may be in an inactive state. Consequently, the remote UE 702 may perform a Radio Resource Channel (RRC) Connection Resume 714, including a relay UE identifier (e.g., Radio Network Temporary Identifier RNTI for relay UE, Cell Identifier for relay UE), with the RAN 706. This may cause the RAN 706 to retrieve 716 a UE context for the remote UE 702.

In one example, during RRC connection resume 714, the remote UE 702 may indicate the relay UE identifier in order to obtain security key material for a peer-to-peer communication link between the remote UE 702 and the relay UE 704. However, due to the RRC Connection Resume message size constraints, the remote UE 702 may not be able to include the relay UE identifier or related ID information.

In such case, the remote UE 702 may send an RRC message 722 with the relay UE identifier to request information or material with which to setup a P2P security key. As a result, the RAN 706 may obtain or derive security key material 724. The security key material 724 may be sent by the RAN 706 to the relay UE 704 in an RRC Reconfiguration message 726 and may receive an RRC Reconfiguration Complete message 728 in return. Similarly, the security key material 724 may be sent by the RAN 706 to the remote UE 702 in an RRC Reconfiguration message 730 and may receive an RRC Reconfiguration Complete message 732 in return.

Generally, the remote UE 702 and relay UE 704 may use the security key material to setup and secure the peer-to-peer communication link 734. For instance, the security key material may be used by the relay UE 704 and the remote UE 702 to generate a relay session key that then secures the peer-to-peer communication link (e.g., relay session key serves to encrypt/decrypt transmissions/communications over the peer-to-peer communication link 734).

In one example, the same security key material is sent to both the Relay UE 704 and the remote UE 702. For instance, such security key material may include: a remote UE identifier (e.g., C-RNTI), a relay UE identifier (e.g., C-RNTI), a root or network session key (KgNB), and/or a ciphering algorithm. The security key material may serve to derive a relay session key (KNRP) which may be used to secure the peer-to-peer communication link 734 (e.g., by using the relay session key with the ciphering algorithm).

In other examples, different security key material is sent to the relay UE 704 and the remote UE 702. For example, a first security key material is sent to the relay UE 704, where the first security key material includes at least the relay session key (KNRP) and an indication of a ciphering algorithm (e.g., an encryption algorithm, an integrity algorithm, etc.). The relay session key may be used with the ciphering algorithm to secure the peer-to-peer communication link. Similarly, a second security key material is sent to the remote UE 602, where the second security key material may include the remote UE identifier (e.g., C-RNTI) and the relay UE identifier (e.g., C-RNTI), which along with the concurrently-sent or previously-obtained network session key (KgNB), may serve for the remote UE 702 to derive or generate the relay session key (KNRP). An indication of the ciphering algorithm (e.g., an encryption algorithm, an integrity algorithm, etc.) may be obtained by the remote UE 702 along with the second security key material or from the relay UE 704 or may otherwise be previously obtained the remote UE 702.

The RAN 706 may be configured to change the root or network session key (KgNB) when it detects that the relay UE has changed. This ensures that the same security key material is not used for a remote UE communicating via a new relay UE, which is assigned the same C-RNTI as the previous relay UE under the same serving cell (gNodeB).

In another approach, the security key material for the peer-to-peer communication link may use freshness/randomness parameters that are exchanged. For instance, the security key material sent to the relay UE 704 and remote UE 702 may include: (a) a relay identifier for the first user equipment (e.g., relay UE 704), (b) a second user equipment identifier for the second user equipment (e.g., remote UE 702), (c) a mobile network node key, (d) a first nonce provided by the first user equipment (e.g., relay UE 704), (e) a second nonce provided by the second user equipment (e.g., remote UE 702), and/or (f) a counter value provided by the managed mobile network node.

In one example, the security key may be used to secure Layer 2 (e.g., PDCP, RLC, and/or MAC) transmissions and/or to secure Layer 3 (e.g., RRC) transmissions over the peer-to-peer communication network. Additionally, a new security key material may also be provided by the managed mobile network every time a base station handover occurs.

Figure 8:
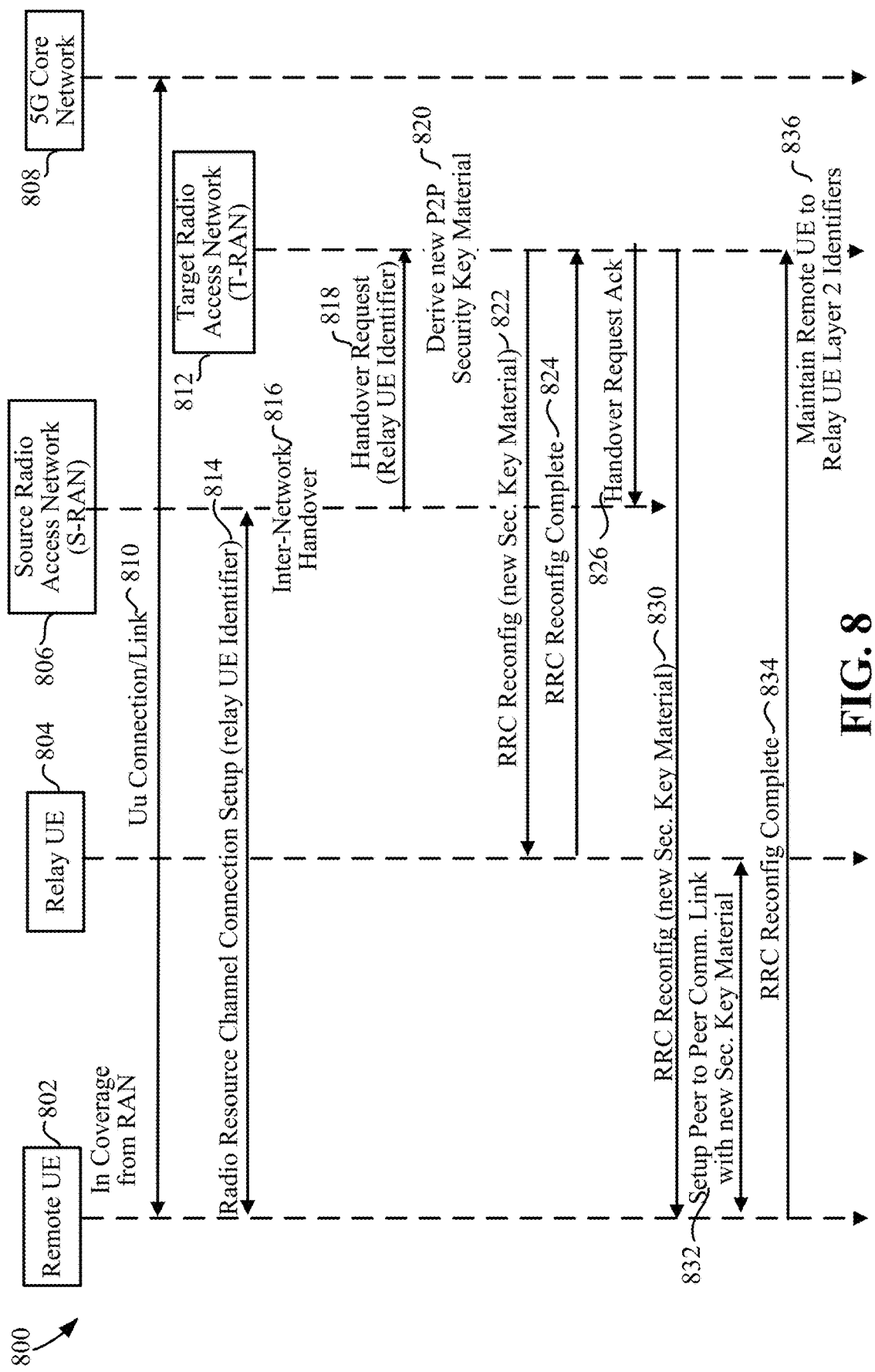
FIG. 8 illustrates yet another exemplary system in which security for a peer-to-peer communication link may be maintained with the assistance from a managed mobile network.

FIG. 8 illustrates yet another exemplary system in which security for a peer-to-peer communication link may be maintained with the assistance from a managed mobile network. In this example, a remote UE 802, served by a source RAN 806, may seek to establish a peer-to-peer communication link with a relay UE 804, served by a target RAN 812. The remote UE 802 may also have an existing Uu-plane connection with the source RAN 806. However, the relay UE 804 is being served by the target RAN 812. To obtain security key material to secure the peer-to-peer communication link, the remote UE 802 may send a Radio Resource Channel (RRC) Message 814, including a relay UE identifier (e.g., Radio Network Temporary Identifier RNTI for relay UE, Physical Cell Identifier for relay UE), to the source RAN 806. However, the source RAN 806 may determine, from a physical cell identifier of the relay UE 804, that the relay UE 804 is being served by a different target RAN 812. This causes the source RAN 806 to initiate an inter-network handover 816 by sending a handover request 818, including the relay UE identifier, to the target RAN 812. In turn, the target RAN 812 may obtain or derive new security key material 820 based on information provided by the source RAN. The new security key material 820 may be sent by the target RAN 812 to the relay UE 804 in an RRC Reconfiguration message 822 and may receive an RRC Reconfiguration Complete message 824 in return. The target RAN 812 may send a handover request acknowledge 826 to the source RAN 806. Subsequently, the target RAN 812 may send the new security key material 820 to the remote UE 802. This allows the remote UE 802 to secure the peer-to-peer communication link 832 with the relay UE 804. For instance, both the remote UE 802 and the relay UE 804 may generate or derive one or more security keys for the peer-to-peer communication link using the new security key material. The remote UE 802 may send an RRC Reconfiguration Complete message 834 to the target RAN 812.

In one example, the security key may be used to secure Layer 2 (e.g., PDCP, RLC, and/or MAC) transmissions over the peer-to-peer communication network. The target RAN 812 may maintain remote UE to relay UE layer 2 identifiers 836.

In securing the peer-to-peer communication link between the remote UE and the relaying UE, various approaches may be used to derive a security key based on the security key material provided by the RAN. These approaches may also avoid reuse of the same security key.

In one approach, the RAN and remote UE may use a remote UE identifier (e.g., C-RNTI) and the relay UE identifier (e.g., C-RNTI) to derive a relay session key ($K_{NRP}$) from a network session key (KgNB) associated with the remote UE. The relay session key ($K_{NRP}$) may be sent to the relay UE 804. The remote UE 802 and relay UE 804 may each use the security key material to setup and secure the peer-to-peer communication link). For instance, the security key material may be used by the relay UE 604 and the remote UE 602 to generate a relay session key that then secures the peer-to-peer communication link (e.g., relay session key serves to encrypt/decrypt transmissions/communications over the peer-to-peer communication link 634).

In one example, the same security key material is sent to both the Relay UE 604 and the remote UE 602. For instance, such security key material may include: a remote UE identifier (e.g., C-RNTI), a relay UE identifier (e.g., C-RNTI), a root or network session key (KgNB), and/or a ciphering algorithm. The security key material may serve to derive a relay session key ($K_{NRP}$) which may be used to secure the peer-to-peer communication link 634 (e.g., by using the relay session key with the ciphering algorithm).

The RAN may be configured to change the network session key (KgNB) when it detects that the relay UE has changed. This ensures that the same security key material is not used for a remote UE communicating via a new relay UE, which is assigned the same C-RNTI as the previous relay UE under the same serving cell (gNodeB).

In another approach, the security key material for the peer-to-peer communication link may use two freshness/randomness parameters that are exchanged. First, the remote UE may contribute a first randomness parameter (e.g., first nonce) as part of the RRC message to the RAN. Second, the serving base station in the RAN may also contribute a second randomness parameter (e.g., second nonce). These randomness parameters are used by the RAN to generate/derive the security key material that is sent to the remote UE and relay UE.

In yet another approach, derivation of the security key material for the peer-to-peer communication link may use at least one counter. The counter may be incremented when a new security key material is derived by the RAN. In one example, such counter may be provided by the remote UE, and the remote UE keeps track of the counter to avoid key reuse.

In other implementations, in establishing a peer-to-peer communication link between a first user equipment and a second user equipment, the peer-to-peer communication link may be secured based on a pre-shared key known to the first user equipment and the second user equipment.

Exemplary UE Device

Figure 9:
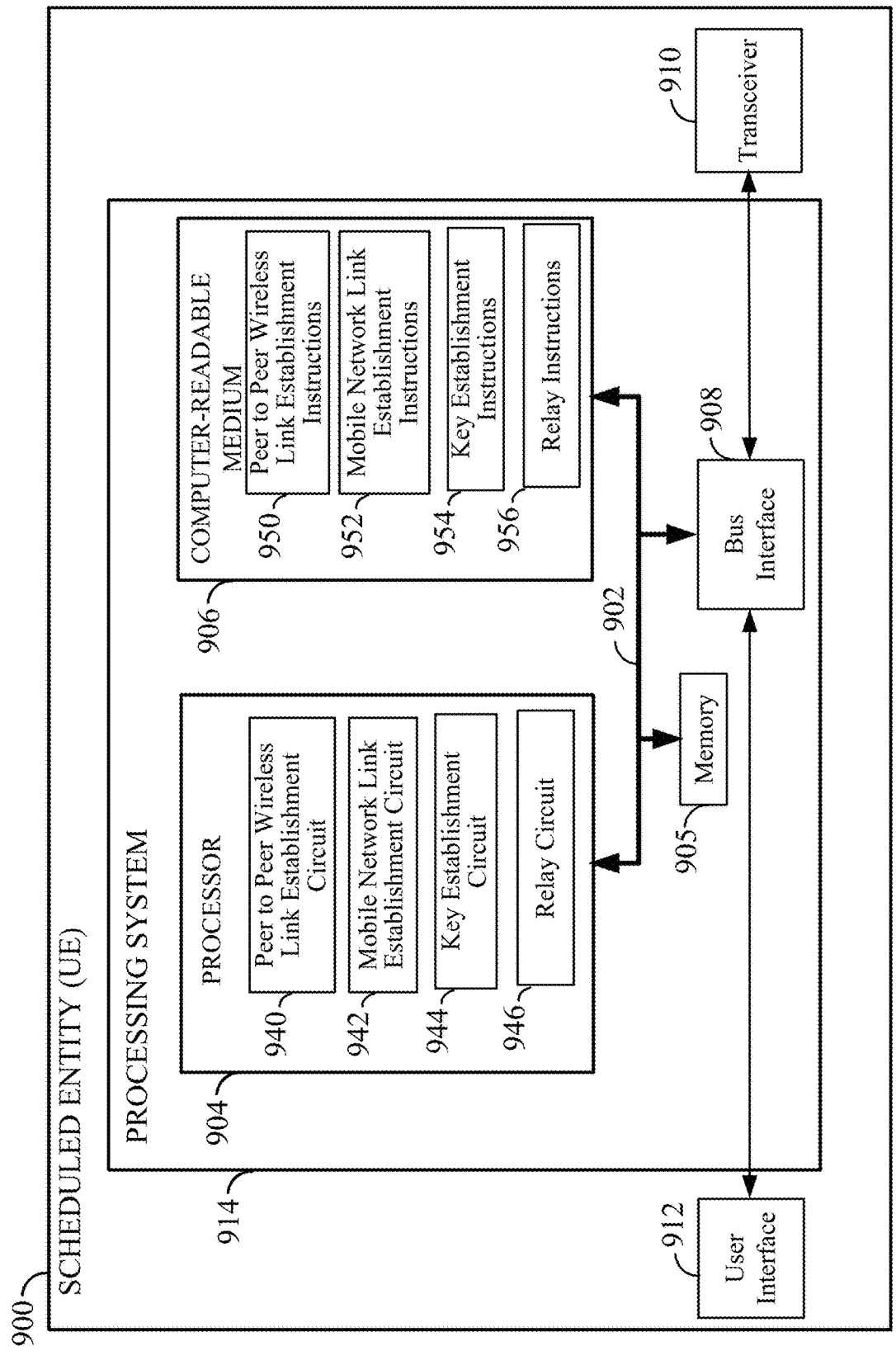
FIG. 9 is a conceptual diagram illustrating an example of a hardware implementation for an exemplary scheduled entity or UE employing a processing system.

FIG. 9 is a conceptual diagram illustrating an example of a hardware implementation for an exemplary scheduled entity or UE 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of FIGS. 1, 2, 4, 5, 6, 7, and 8. In various configurations, the scheduled entity or UE 900 may function as a remote UE or a relay UE.

The scheduled entity 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 900 may be configured to perform any one or more of the functions described herein. That is, the processor 904, as utilized in the scheduled entity 900, may be used to implement any one or more of the processes and procedures described and illustrated in FIGS. 4, 5, 6, 7, 8, 10, and 11.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. According to one implementation, the transceiver 910 may include a peer-to-peer wireless interface and a mobile network interface. Depending upon the nature of the apparatus, a user interface 912 (e.g., keypad, display, speaker, microphone, joystick) may also be provided.

In some aspects of the disclosure, the processor 904 may include a peer-to-peer wireless link establishment circuit 940 configured for various functions, including, for example, setting up a short-range peer-to-peer communication link to and from other user equipment. A mobile network link establishment circuit 942 may serve to, for example, setup a mobile network communication link to and from a manage network node. A key establishment circuit 944 may serve to establish, obtain, and/or derive one or more keys used in for authenticating and/or securing transmissions (at various layers of a protocol stack). A relay circuit may serve to perform various functions for relaying transmission between the peer-to-peer communication link and the mobile network communication link.

The processor 904 may be responsible for managing the bus 902 and general processing, including the execution of software stored on the computer-readable medium 906. The software, when executed by the processor 904, causes the processing system 914 to perform the various functions described in FIGS. 4, 5, 6, 7, 8 and 9. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 906 may include traffic routing software or instructions 950 configured for various functions, including, for example, establishing a peer-to-peer wireless link with other UEs. Similarly, mobile network link establishment instructions 952 may serve to establish a communication link with a managed mobile network node (e.g., base station). Key establishment instructions 954 may serve to obtain, derive, and/or generate one or more keys used to secure transmissions over the peer-to-peer communication link and/or the mobile network communication link Relay instructions 956 may serve to relay transmissions between the peer-to-peer communication link and/or the mobile network communication link. Of course, in the above examples, the circuitry included in the processor 904 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, 4, 5, 6, 7, 8 and/or 9 and utilizing, for example, the processes and/or algorithms described herein.

In one exemplary implementation where the scheduled entity 900 is configured to operate as a remote UE, the transceiver 910 may include a peer-to-peer wireless interface to communicate with other wireless devices. The processor 904 (e.g., processing circuit) may be coupled to the wireless interface. The processor 904 may be configured to (a) identify a second user equipment that can communicate via the peer-to-peer wireless interface and serve as a relay to a managed mobile network node, (b) obtain a relay session key material from the managed mobile network node, (c) establish or modify a peer-to-peer communication link with the second user equipment, the peer-to-peer communication link secured based on the relay session key material, and/or (d) establish, over the peer-to-peer communication link, a protocol data unit session with the managed mobile network node. In various examples, the relay session key material may include a key or one or more parameters incorporating device identifiers, nonces, and counters.

In one example, the first user equipment (e.g., schedule entity 900) may include a mobile network interface coupled to the processing circuit, the mobile network interface serving to communicate with the managed mobile network. The processing circuit may be further configured to: (a) send a message to the managed mobile network node via the mobile network interface, the message including a relay identifier for the second user equipment, and (b) receive the relay session key material from the managed mobile network node in response to the message, wherein the relay session key material is a function of the relay identifier.

In another example, where a direct communication link to the managed mobile network node is not available, the peer-to-peer communication link may be established prior to the relay session key material being obtained. The processing circuit may be further configured to: (a) send a message to the managed mobile network node via the mobile network interface, the message including a relay identifier for the second user equipment, (b) receive the relay session key material from the managed mobile network node in response to the message, wherein the relay session key material is a function of the relay identifier, and (c) secure the peer-to-peer communication link based on the relay session key material.

In various implementations, the relay session key material may be based on at least two of: (a) a relay identifier for the second user equipment; (b) a first user equipment identifier; (c) a target mobile network node key; (d) a first nonce provided by the first user equipment; (e) a second nonce provided by the second user equipment; and (f) a counter value provided by the managed mobile network node.

Figure 10:
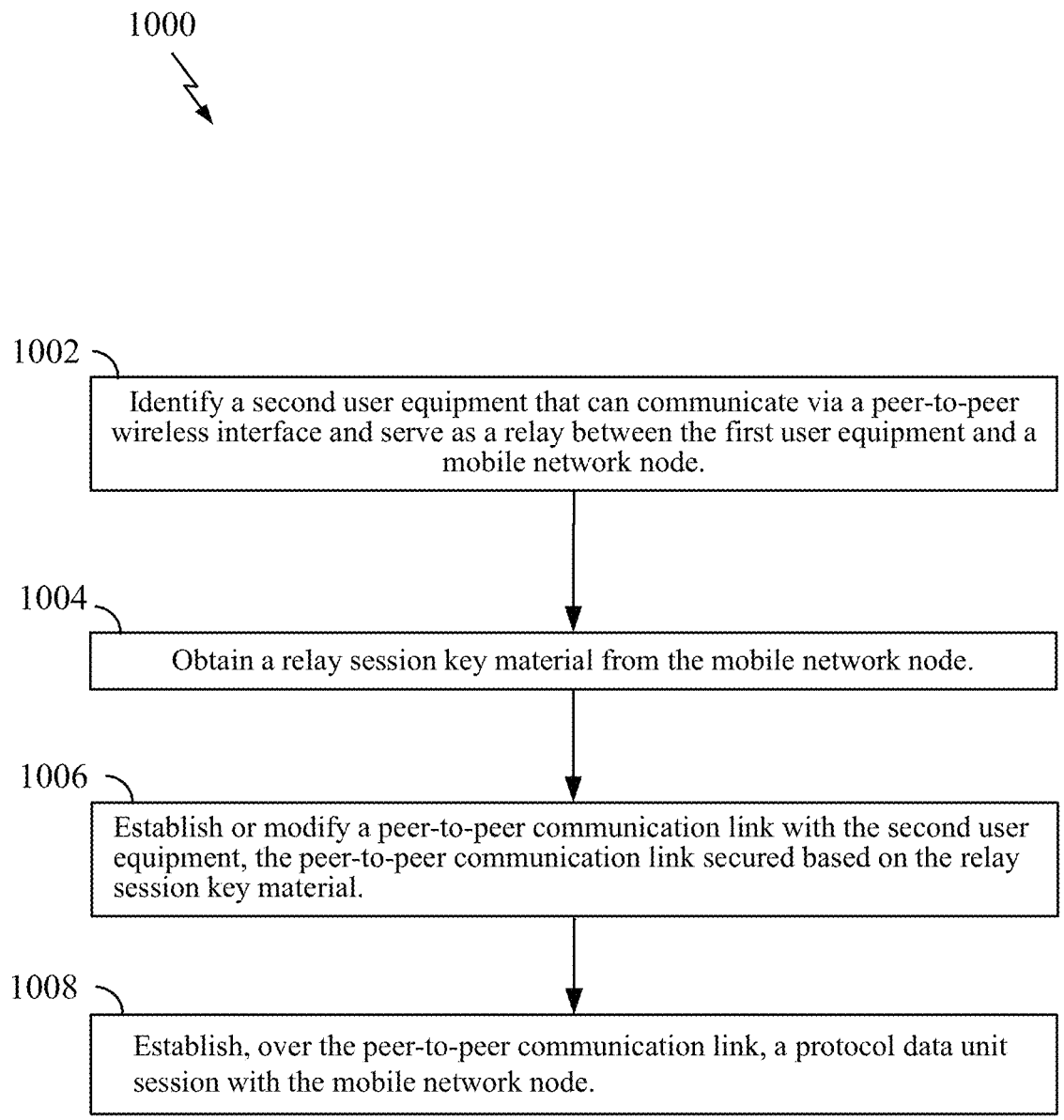
FIG. 10 is a flow chart illustrating a first exemplary method for securing a peer-to-peer communication link used for relaying transmissions to/from a managed mobile network node.

FIG. 10 is a flow chart illustrating a first exemplary method 1000 for securing a peer-to-peer communication link used for relaying transmissions to/from a managed mobile network node. As described below, some or all illustrated features may be omitted in a particular implementation within the scope of the present disclosure, and some illustrated features may not be required for implementation of all embodiments. In some examples, the method 1000 may be carried out by the scheduled entity 900 illustrated in FIG. 9. In some examples, the method 1000 may be carried out by any suitable apparatus or means for carrying out the functions or algorithm described below. In one implementation, the method 1000 may be operational at a first user equipment (UE), e.g., a remote UE.

The first user equipment may identify a second user equipment that can communicate via a peer-to-peer wireless interface and serve as a relay between the first user equipment and a managed mobile network node 1002. In various examples, the managed mobile network node may be part of a 5G radio access network (e.g., a Radio Access Network Node, a base station, etc.). The peer-to-peer communication link may be a Proximity Services Sidelink (PC5).

A relay session key material may be obtained from the managed mobile network node 1004. The first user equipment may then establish or modify a peer-to-peer communication link with the second user equipment, the peer-to-peer communication link secured based on the relay session key material 1006. A protocol data unit session may then be established with the managed mobile network node over the peer-to-peer communication link 1008. Data for the protocol data session may be sent, over the peer-to-peer communication link, to the managed mobile network node.

Where the first user equipment has a direct link to the managed network node, it may send a message directly to the managed mobile network node, where the message includes a relay identifier for the second user equipment. In response, the first user equipment may receive the relay session key material from the managed mobile network node in response to the message, wherein the relay session key material is a function of at least one of the relay identifier, a first user equipment identifier, and a mobile network node key. In one example, identifying the second user equipment includes obtaining the relay identifier from the second user equipment, and the relay identifier is at least one of: (a) a radio network temporary identifier for the second user equipment, and (b) a cell identifier indicative of a serving a mobile network node for the second user equipment.

Where the first user equipment has no direct link to the managed network node, the peer-to-peer communication link may be established prior to the relay session key material being obtained. The first user equipment may then send a message to the managed mobile network node via the peer-to-peer communication link, the message including a relay identifier for the second user equipment. In response, the first user equipment may receive the relay session key material from the managed mobile network node in response to the message, wherein the relay session key material is a function of at least one of the relay identifier, a first user equipment identifier, and a mobile network node key. The peer-to-peer communication link may then be secured based on the relay session key material.

In various examples, the relay session key material may be based on at least two of: (a) a relay identifier for the second user equipment; (b) a first user equipment identifier; (c) a target mobile network node key; (d) a first nonce provided by the first user equipment; (e) a second nonce provided by the second user equipment; and/or (f) a counter value provided by the managed mobile network node.

In one implementation, a relay session key may be derived/generated from the relay session key material. The peer-to-peer communication link may then be secured using the relay session key. That is, transmissions in one or more layers of a protocol stack over the peer-to-peer communication link may be encrypted/decrypted as a function of such relay session key.

Figure 11:
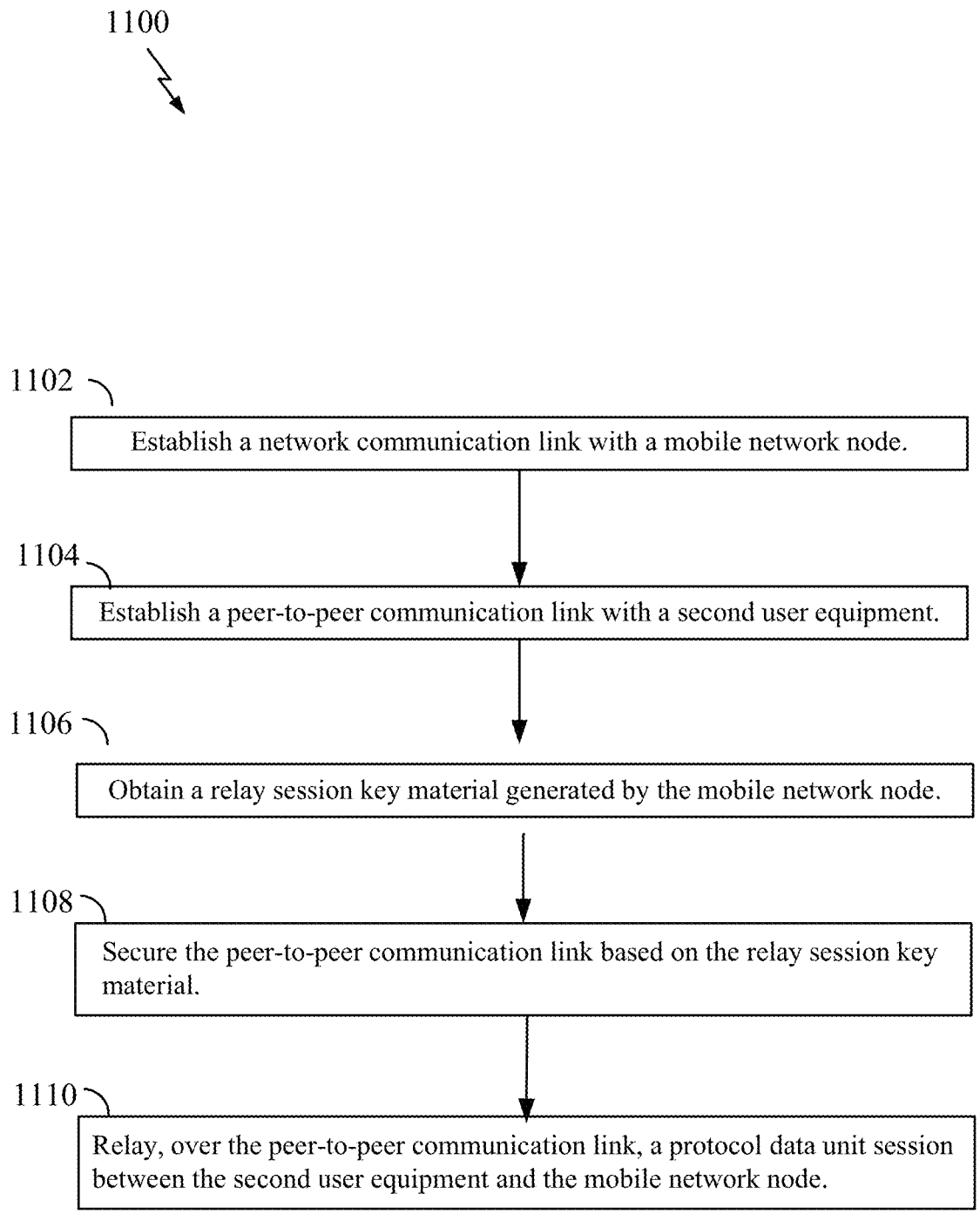
FIG. 11 is a flow chart illustrating a second exemplary method for securing a peer-to-peer communication link used for relaying transmissions to/from a managed mobile network node.

FIG. 11 is a flow chart illustrating a second exemplary method 1100 for securing a peer-to-peer communication link used for relaying transmissions to/from a managed mobile network node. In one implementation, the method 1100 may be operational at a first user equipment (UE), e.g., a relay UE. A network communication link may be established with a managed mobile network node 1102. A peer-to-peer communication link may also be established with a second user equipment 1104. A relay session key material may be obtained that is generated by the managed mobile network node obtaining 1106. The peer-to-peer communication link may be secured based on the relay session key material 1108. A protocol data unit session between the second user equipment and the managed mobile network node may be relayed, over the peer-to-peer communication link 1110.

Figure 12:
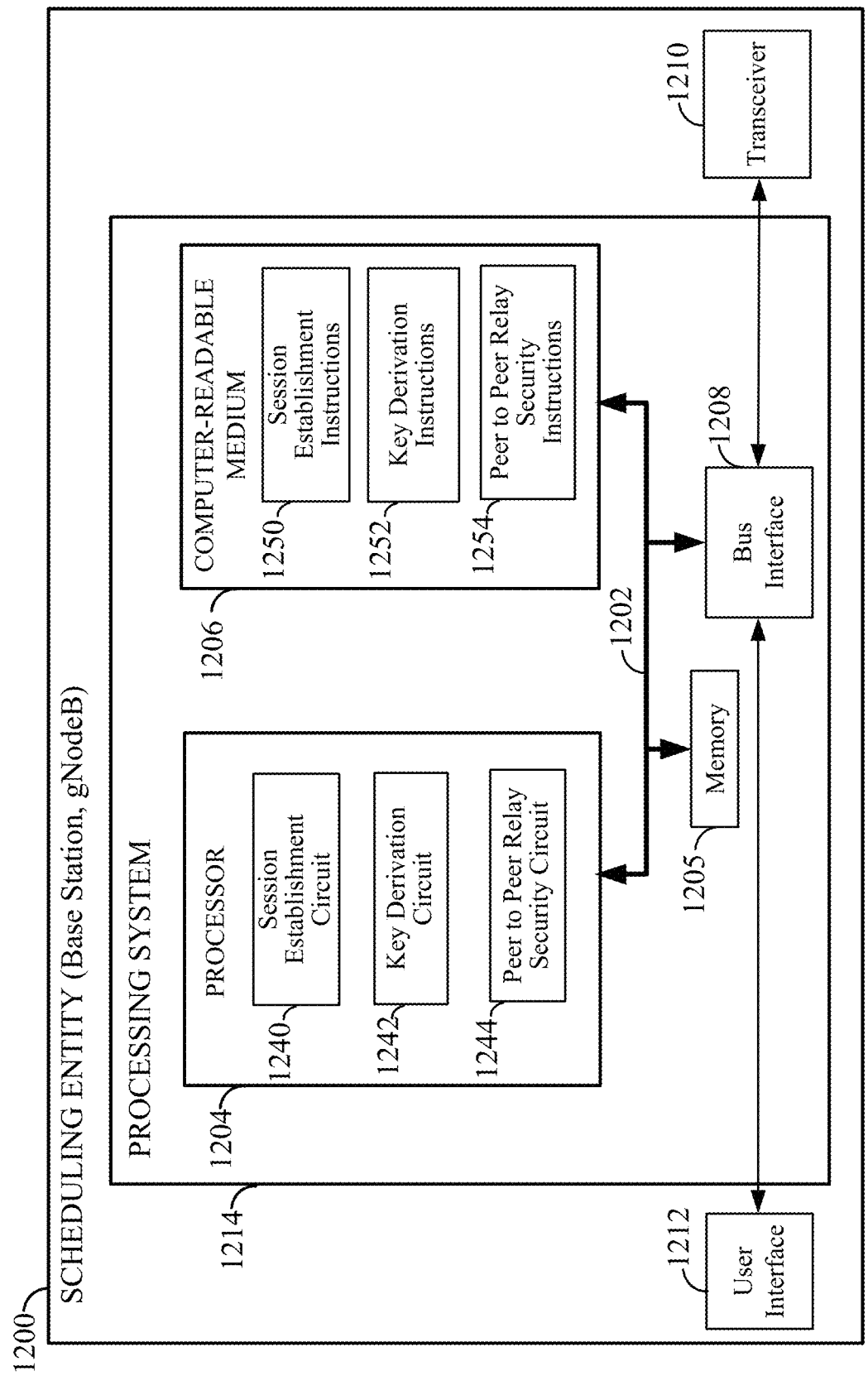
FIG. 12 is a block diagram illustrating an example of a hardware implementation for a scheduling entity (e.g., base station, gNodeB, managed mobile network node) employing a processing system.

FIG. 12 is a block diagram illustrating an example of a hardware implementation for a scheduling entity (e.g., base station, gNodeB, managed mobile network node) employing a processing system 1214. For example, the scheduling entity 1200 may be a base station, gNodeB, managed mobile network node, or network node as illustrated in any one or more of FIGS. 1, 2, 4, 5, 6, 7, and 8.

The scheduling entity 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1200 may be configured to perform any one or more of the functions described herein. That is, the processor 1304, as utilized in a scheduling entity 1200, may be used to implement any one or more of the processes and procedures described below and illustrated in the flow diagram of FIG. 13, to be discussed later.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a communication interface or means for communicating with various other apparatus over a transmission medium. Depending upon the nature of the apparatus, a user interface 1212 (e.g., keypad, display, speaker, microphone, joystick) may also be provided.

In some aspects of the disclosure, the processor 1204 may include a session establishment circuit 1240 configured for various functions, including, for example, setting up and authenticating wireless communication sessions with one or more mobile devices and/or user equipment. A key derivation circuit 1242 may serve to generate or derive security material (e.g., based on device keys, etc.) to secure communications to/from the scheduling entity. A peer-to-peer relay security circuit 1244 may serve to derive security material used to secure a peer-to-peer connection that was established between two user equipment without the assistance of the scheduling entity 1200.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1304 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1206 may include session establishment software or instructions 1250, key derivation software or instructions 1252, and/or peer-to-peer relay security software or instructions 1254. Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1, 2, 4, 5, 6, 7 and/or 8 and utilizing, for example, the processes and/or algorithms described herein.

Figure 13:
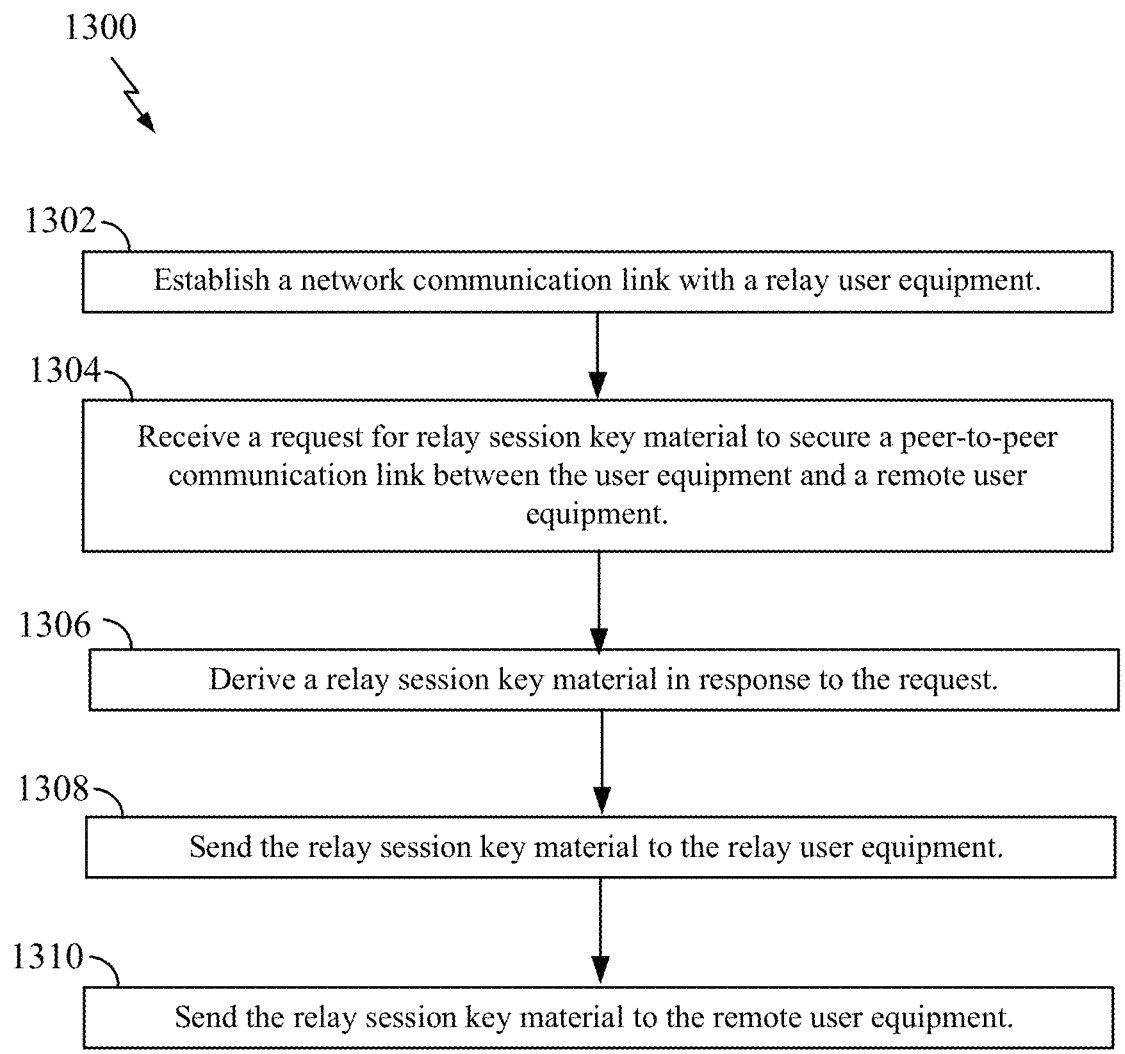
FIG. 13 is a flow chart illustrating an exemplary method for securing a peer-to-peer communication link in accordance with some aspects of the present disclosure.

FIG. 13 is a flow chart illustrating an exemplary method 1300 for securing a peer-to-peer communication link in accordance with some aspects of the present disclosure. A mobile network node may establish a network communication link with a relay user equipment 1302. A request for relay session key material may be received to secure a peer-to-peer communication link between the relay user equipment and a remote user equipment 1304. Consequently, the mobile network node may derive a relay session key material in response to the request 1306. The relay session key material may be sent to the relay user equipment 1308 and to the remote user equipment 1310.

In one implementation, where the second user equipment has a direct communication link to the managed mobile network node, the first user device may provide a relay identifier to the second user equipment, wherein the relay session key material is a function of the relay identifier. In one example, the relay identifier may be at least one of: (a) a radio network temporary identifier for the first user equipment, and (b) a cell identifier indicative of a serving a mobile network node for the first user equipment.

In one implementation, where the second user equipment has no direct communication link to the managed mobile network node, the peer-to-peer communication link may be established prior to the relay session key material being obtained. Then the first user equipment may relay a message, on behalf of the second user equipment, to the managed mobile network node via the peer-to-peer communication link, the message including a relay identifier for the first user equipment. The first user equipment may receive the relay session key material from the managed mobile network node in response to the message, wherein the relay session key material is a function of the relay identifier, a second user equipment identifier, and a mobile network node key. The peer-to-peer communication link may then be secured based on the relay session key material.

In one implementation, prior to securing the peer-to-peer communication link based on the relay session key material, the first user equipment allows only radio resource control signal forwarding over the peer-to-peer communication link.

In another implementation, prior to securing the peer-to-peer communication link based on the relay session key material, transmissions over the peer-to-peer communication link are secured by public-private key pairs for the first user equipment and the second user equipment.

According to yet another aspect, receipt of the relay session key material occurs after the second user equipment has been authenticated by the managed mobile network node, and then the first user equipment sets up a radio bearer for the peer-to-peer communication link.

The following provides an overview of the present disclosure:

Aspect 1: A method operational at a first user equipment, the method comprising: identifying a second user equipment that can communicate via a peer-to-peer wireless interface and serve as a relay between the first user equipment and a mobile network node; obtaining a relay session key material from the mobile network node; establishing or modifying a peer-to-peer communication link with the second user equipment, the peer-to-peer communication link secured based on the relay session key material; and establishing, over the peer-to-peer communication link, a protocol data unit session with the mobile network node.

Aspect 2: The method of aspect 1, further comprising: sending a message directly to the mobile network node, the message including a relay identifier for the second user equipment; and receiving the relay session key material from the mobile network node in response to the message.

Aspect 3: The method of aspect 2, wherein identifying the second user equipment includes obtaining the relay identifier from the second user equipment, and the relay identifier is at least one of: (a) a radio network temporary identifier for the second user equipment, and (b) a cell identifier indicative of a serving a mobile network node for the second user equipment.

Aspect 4: The method of aspects 1, 2, and/or 3, wherein the peer-to-peer communication link is established prior to the relay session key material being obtained, and the method further comprising: sending a message to the mobile network node via the peer-to-peer communication link, the message including a relay identifier for the second user equipment; receiving the relay session key material from the mobile network node in response to the message; and securing the peer-to-peer communication link based on the relay session key material.

Aspect 5: The method of aspects 1, 2, 3, and/or 4, wherein the relay session key material includes or is based on at least two of: (a) a relay identifier for the second user equipment; (b) a first user equipment identifier; (c) a target mobile network node key; (d) a first nonce provided by the first user equipment; (e) a second nonce provided by the second user equipment; and/or (f) a counter value provided by the mobile network node.

Aspect 6: The method of aspects 1, 2, 3, 4, and/or 5, further comprising: deriving a relay session key from the relay session key material; and securing the peer-to-peer communication link using the relay session key.

Aspect 7: The method of aspects 1, 2, 3, 4, 5, and/or 6, wherein the mobile network node is part of a 5G radio access network.

Aspect 8: The method of aspects 1, 2, 3, 4, 5, 6 and/or 7, further comprising: sending, over the peer-to-peer communication link, data for the protocol data session to the mobile network node.

Aspect 9: The method of aspects 1 through 8, wherein the peer-to-peer communication link is a Proximity Services Sidelink (PC5).

Aspect 10: A first user equipment, comprising: a peer-to-peer wireless interface to communicate with other wireless devices; and a processing circuit coupled to the wireless interface, the processing circuit configured to identify a second user equipment that can communicate via the peer-to-peer wireless interface and serve as a relay to a mobile network node, obtain a relay session key material from the mobile network node, establish or modify a peer-to-peer communication link with the second user equipment, the peer-to-peer communication link secured based on the relay session key material, and establish, over the peer-to-peer communication link, a protocol data unit session with the mobile network node.

Aspect 11: The first user equipment of aspect 10, further comprising: a mobile network interface coupled to the processing circuit, the mobile network interface to communicate with a mobile network node; and wherein the processing circuit is further configured to: send a message to the mobile network node via the mobile network interface, the message including a relay identifier for the second user equipment, and receive the relay session key material from the mobile network node in response to the message, wherein the relay session key material is a function of the relay identifier.

Aspect 12: The first user equipment of aspects 10 or 11, wherein the peer-to-peer communication link is established prior to the relay session key material being obtained, and the processing circuit is further configured to: send a message to the mobile network node via the mobile network interface, the message including a relay identifier for the second user equipment, receive the relay session key material from the mobile network node in response to the message, wherein the relay session key material is a function of the relay identifier, and secure the peer-to-peer communication link based on the relay session key material.

Aspect 13: The first user equipment of aspects 10, 11, or 12, wherein the relay session key material is based on at least two of: (a) a relay identifier for the second user equipment; (b) a first user equipment identifier; (c) a target mobile network node key; (d) a first nonce provided by the first user equipment; (e) a second nonce provided by the second user equipment; and (f) a counter value provided by the mobile network node.

Aspect 14: The first user equipment of aspects 10, 11, 12, or 13, wherein the processing circuit is further configured to: derive a relay session key from the relay session key material; and secure the peer-to-peer communication link using the relay session key.

Aspect 15: The first user equipment of aspects 10, 11, 12, 13, or 14, wherein the managed mobile network node is part of a 5G radio access network.

Aspect 16: A method operational at a first user equipment, the method comprising:
establishing a network communication link with a mobile network node; establishing a peer-to-peer communication link with a second user equipment; obtaining a relay session key material generated by the mobile network node; securing the peer-to-peer communication link based on the relay session key material; and relaying, over the peer-to-peer communication link, a protocol data unit session between the second user equipment and the mobile network node.

Aspect 17: The method of aspect 16, further comprising: providing a relay identifier to the second user equipment, wherein the relay session key material is a function of the relay identifier.

Aspect 18: The method of aspect 17, wherein the relay identifier is at least one of: (a) a radio network temporary identifier for the first user equipment, and (b) a cell identifier indicative of a serving a mobile network node for the first user equipment.

Aspect 19: The method of aspects 16, 17, or 18, wherein the peer-to-peer communication link is established prior to the relay session key material being obtained, and the method further comprising: relaying a message, on behalf of the second user equipment, to the mobile network node via the peer-to-peer communication link, the message including a relay identifier for the first user equipment; receiving the relay session key material from the mobile network node in response to the message; and securing the peer-to-peer communication link based on the relay session key material.

Aspect 20: The method of aspects 16, 17, 18, or 19, wherein the relay session key material includes at least a relay session key and security configuration identifying an algorithm for the relay session.

Aspect 21: The method of aspects 16, 17, 18, or 19, deriving a relay session key from the relay session key material; and securing the peer-to-peer communication link using the relay session key.

Aspect 22: The method of aspects 16, 17, 18, 19, 20, or 21, wherein prior to securing the peer-to-peer communication link based on the relay session key material, the first user equipment allows only radio resource control signal forwarding over the peer-to-peer communication link.

Aspect 23: The method of aspects 16, 17, 18, 19, 20, or 21, wherein prior to securing the peer-to-peer communication link based on the relay session key material, transmissions over the peer-to-peer communication link are secured by public-private key pairs for the first user equipment and the second user equipment.

Aspect 24: The method of aspects 16, 17, 18, 19, 20, 21, 22, or 23, wherein receipt of the relay session key material occurs after the second user equipment has been authenticated by the mobile network node, and then the first user equipment sets up a radio bearer for the peer-to-peer communication link.

Aspect 25: The method of aspects 16 through 24, wherein the mobile network node is part of a 5G radio access network.

Aspect 26: The method of aspects 16 through 24, wherein the peer-to-peer communication link is a Proximity Services Sidelink (PC5).

Aspect 27: A first user equipment, comprising: a mobile network interface to communicate with a mobile network node; a peer-to-peer wireless interface to communicate with other wireless devices; and a processing circuit coupled to the wireless interface, the processing circuit configured to: establish a network communication link with the mobile network node; establish a peer-to-peer communication link with a second user equipment; obtain a relay session key material generated by the mobile network node; secure the peer-to-peer communication link secured based on the relay session key material; and relay, over the peer-to-peer communication link, a protocol data unit session between the second user equipment and the mobile network node.

Aspect 28: The first user equipment of aspect 27, wherein the processing circuit is further configured to: provide a relay identifier to the second user equipment, wherein the relay session key material includes or is based on the relay identifier, a second user equipment identifier, and a mobile network node key.

Aspect 29: The first user equipment of aspect 28, wherein the relay identifier is at least one of: (a) a radio network temporary identifier for the first user equipment, and (b) a cell identifier indicative of a serving a mobile network node for the first user equipment.

Aspect 30: The first user equipment of aspects 27, 28 or 29, wherein the peer-to-peer communication link is established prior to the relay session key being obtained, and the processing circuit is further configured to: relaying a message, on behalf of the second user equipment, to the mobile network node via the peer-to-peer communication link, the message including a relay identifier for the first user equipment; receiving the relay session key from the mobile network node in response to the message; and securing the peer-to-peer communication link based on the relay session key.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method operational at a first user equipment, the method comprising:
    identifying a second user equipment that can communicate via a peer-to-peer wireless interface and serve as a relay between the first user equipment and a mobile network node;
    obtaining a relay session key material from the mobile network node;
    establishing or modifying a peer-to-peer communication link with the second user equipment, the peer-to-peer communication link secured based on the relay session key material;
    establishing, over the peer-to-peer communication link, a protocol data unit session with the mobile network node; and further comprising:

sending a message directly to the mobile network node, the message including a relay identifier for the second user equipment; and
receiving the relay session key material from the mobile network node in response to the message.

2. The method of claim 1, wherein identifying the second user equipment includes obtaining the relay identifier from the second user equipment, and the relay identifier is at least one of: (a) a radio network temporary identifier for the second user equipment, and (b) a cell identifier indicative of a serving a mobile network node for the second user equipment.

3. The method of claim 1, wherein the peer-to-peer communication link is established prior to the relay session key material being obtained, and the method further comprising:
sending a message to the mobile network node via the peer-to-peer communication link, the message including a relay identifier for the second user equipment;
receiving the relay session key material from the mobile network node in response to the message; and
securing the peer-to-peer communication link based on the relay session key material.

4. The method of claim 1, wherein the relay session key material includes or is based on at least two of:
(a) a relay identifier for the second user equipment;
(b) a first user equipment identifier;
(c) a target mobile network node key;
(d) a first nonce provided by the first user equipment;
(e) a second nonce provided by the second user equipment; and
(f) a counter value provided by the mobile network node.

5. The method of claim 1, further comprising:
deriving a relay session key from the relay session key material; and
securing the peer-to-peer communication link using the relay session key.

6. The method of claim 1, wherein the mobile network node is part of a 5G radio access network.

7. The method of claim 1, further comprising:
sending, over the peer-to-peer communication link, data for the protocol data session to the mobile network node.

8. The method of claim 1, wherein the peer-to-peer communication link is a Proximity Services Sidelink (PC5).

9. A first user equipment, comprising:
a peer-to-peer wireless interface to communicate with other wireless devices; and
a processing circuit coupled to the wireless interface, the processing circuit configured to identify a second user equipment that can communicate via the peer-to-peer wireless interface and serve as a relay to a mobile network node,
obtain a relay session key material from the mobile network node,
establish or modify a peer-to-peer communication link with the second user equipment, the peer-to-peer communication link secured based on the relay session key material,
establish, over the peer-to-peer communication link, a protocol data unit session with the mobile network node, and further comprising:
send a message to the mobile network node via the mobile network interface, the message including a relay identifier for the second user equipment, and
receive the relay session key material from the mobile network node in response to the message, wherein the relay session key material is a function of the relay identifier.

10. The first user equipment of claim 9, wherein the peer-to-peer communication link is established prior to the relay session key material being obtained, and the processing circuit is further configured to:
send a message to the mobile network node via the mobile network interface, the message including a relay identifier for the second user equipment,
receive the relay session key material from the mobile network node in response to the message, wherein the relay session key material is a function of the relay identifier, and
secure the peer-to-peer communication link based on the relay session key material.

11. The first user equipment of claim 9, wherein the relay session key material is based on at least two of:
(a) a relay identifier for the second user equipment;
(b) a first user equipment identifier;
(c) a target mobile network node key;
(d) a first nonce provided by the first user equipment;
(e) a second nonce provided by the second user equipment; and
(f) a counter value provided by the mobile network node.

12. The first user equipment of claim 9, wherein the processing circuit is further configured to:
derive a relay session key from the relay session key material; and
secure the peer-to-peer communication link using the relay session key.

13. The first user equipment of claim 9, wherein the mobile network node is part of a 5G radio access network.

14. A method operational at a first user equipment, the method comprising:
establishing a network communication link with a mobile network node;
establishing a peer-to-peer communication link with a second user equipment;
obtaining a relay session key material generated by the mobile network node;
securing the peer-to-peer communication link based on the relay session key material;
relaying, over the peer-to-peer communication link, a protocol data unit session between the second user equipment and the mobile network node; and
wherein the peer-to-peer communication link is established prior to the relay session key material being obtained, and the method further comprising:
relaying a message, on behalf of the second user equipment, to the mobile network node via the peer-to-peer communication link, the message including a relay identifier for the first user equipment;
receiving the relay session key material from the mobile network node in response to the message; and
securing the peer-to-peer communication link based on the relay session key material.

15. The method of claim 14, further comprising:
providing a relay identifier to the second user equipment, wherein the relay session key material is a function of the relay identifier.

16. The method of claim 15, wherein the relay identifier is at least one of: (a) a radio network temporary identifier for the first user equipment, and (b) a cell identifier indicative of a serving a mobile network node for the first user equipment.

17. The method of claim 14, wherein the relay session key material includes at least a relay session key and a security configuration identifying an algorithm for the relay session.

18. The method of claim 14, further comprising:
deriving a relay session key from the relay session key material; and
securing the peer-to-peer communication link using the relay session key.

19. The method of claim 14, wherein prior to securing the peer-to-peer communication link based on the relay session key material, the first user equipment allows only radio resource control signal forwarding over the peer-to-peer communication link.

20. The method of claim 14, wherein prior to securing the peer-to-peer communication link based on the relay session key material, transmissions over the peer-to-peer communication link are secured by public-private key pairs for the first user equipment and the second user equipment.

21. The method of claim 14, wherein receipt of the relay session key material occurs after the second user equipment has been authenticated by the mobile network node, and then the first user equipment sets up a radio bearer for the peer-to-peer communication link.

22. The method of claim 14, wherein the mobile network node is part of a 5G radio access network.

23. The method of claim 14, wherein the peer-to-peer communication link is a Proximity Services Sidelink (PC5).

24. A first user equipment, comprising:
a mobile network interface to communicate with a mobile network node;
a peer-to-peer wireless interface to communicate with other wireless devices; and
a processing circuit coupled to the wireless interface, the processing circuit configured to:
establish a network communication link with the mobile network node;
establish a peer-to-peer communication link with a second user equipment;
obtain a relay session key material generated by the mobile network node;
secure the peer-to-peer communication link secured based on the relay session key material;
relay, over the peer-to-peer communication link, a protocol data unit session between the second user equipment and the mobile network node; and
wherein the peer-to-peer communication link is established prior to the relay session key being obtained, and the processing circuit is further configured to:
relaying a message, on behalf of the second user equipment, to the mobile network node via the peer-to-peer communication link, the message including a relay identifier for the first user equipment;
receiving the relay session key from the mobile network node in response to the message; and
securing the peer-to-peer communication link based on the relay session key.

25. The first user equipment of claim 24, wherein the processing circuit is further configured to:
provide a relay identifier to the second user equipment, wherein the relay session key material includes or is based on the relay identifier, a second user equipment identifier, and a mobile network node key.

26. The first user equipment of claim 25, wherein the relay identifier is at least one of: (a) a radio network temporary identifier for the first user equipment, and (b) a cell identifier indicative of a serving a mobile network node for the first user equipment.

* * * * *